United States Patent
Fujii et al.

(10) Patent No.: US 7,633,857 B2
(45) Date of Patent: Dec. 15, 2009

(54) NODE AND METHOD OF SETTING BACKUP PATH

(75) Inventors: Yasuki Fujii, Kawasaki (JP); Keiji Miyazaki, Kawasaki (JP); Shinya Kano, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 11/785,894

(22) Filed: Apr. 20, 2007

(65) Prior Publication Data

US 2008/0080367 A1 Apr. 3, 2008

(30) Foreign Application Priority Data

Sep. 29, 2006 (JP) .............................. 2006-268495

(51) Int. Cl.
H04J 1/16 (2006.01)
(52) U.S. Cl. ................................ 370/223; 398/3; 398/4
(58) Field of Classification Search ................. 370/217, 370/218, 219, 220, 221, 222, 223, 401, 404; 398/2, 3, 4, 5
See application file for complete search history.

(56) References Cited

U.S. PATENT DOCUMENTS 5,440,540 A * 8/1995 Kremer ...................... 370/223
7,545,735 B1 * 6/2009 Shabtay et al. .............. 370/217
2003/0058789 A1 * 3/2003 Sugawara et al. ........... 370/222

FOREIGN PATENT DOCUMENTS

JP 2003-101558 4/2003
JP 2005-260708 9/2005

* cited by examiner

Primary Examiner—William Trost, IV
Assistant Examiner—Siming Liu
(74) Attorney, Agent, or Firm—Staas & Halsey LLP

(57) ABSTRACT

A node in a first ring stores therein connection information about connecting nodes between a second ring and a third ring. Upon receiving a route of a working path by a signaling, the node determines any one of nodes composing the second ring as a branch node. If the working path is not terminated on an end node that the working path ends in the second ring thereon, and also if no node composing the second ring stores therein connection information between the end node and any one of the connecting nodes in the third ring that is connected to the second ring, the node compares each condition of selectable routes of a backup path between the end node and the branch node, and selects any one of the selectable routes as the backup path based on a result of comparison.

10 Claims, 12 Drawing Sheets

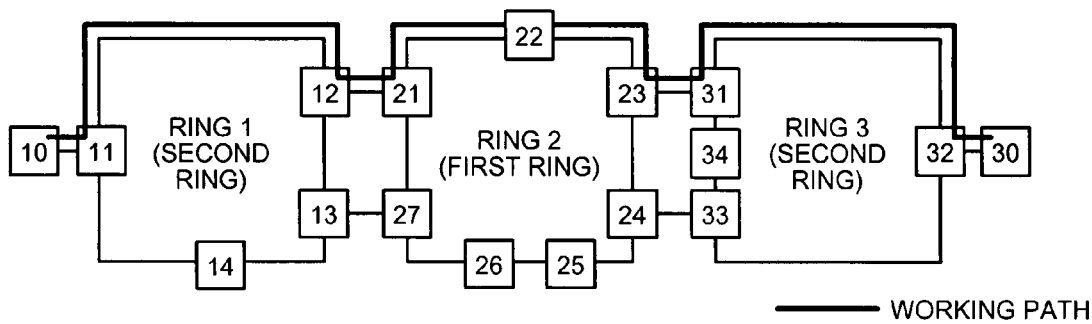
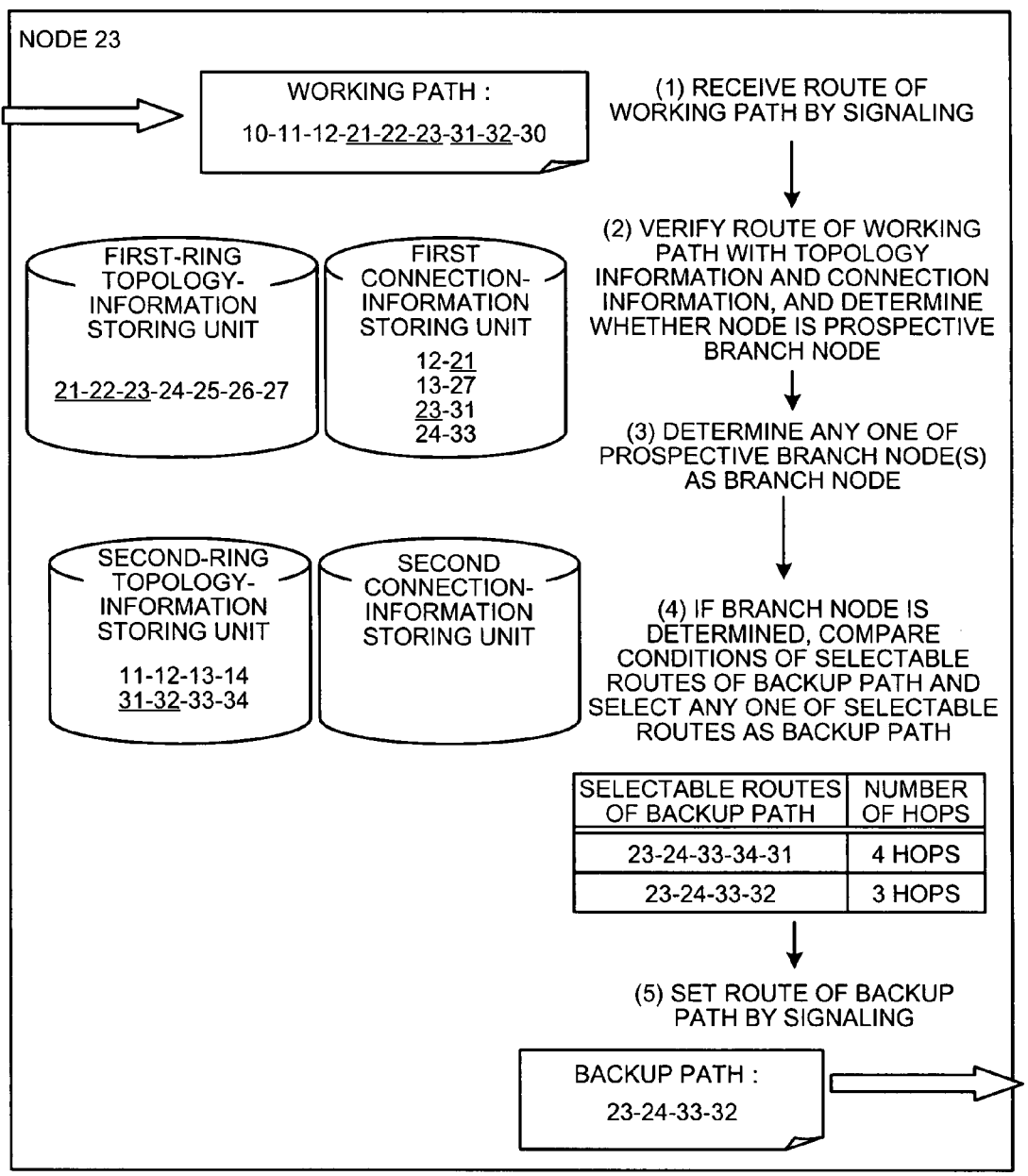

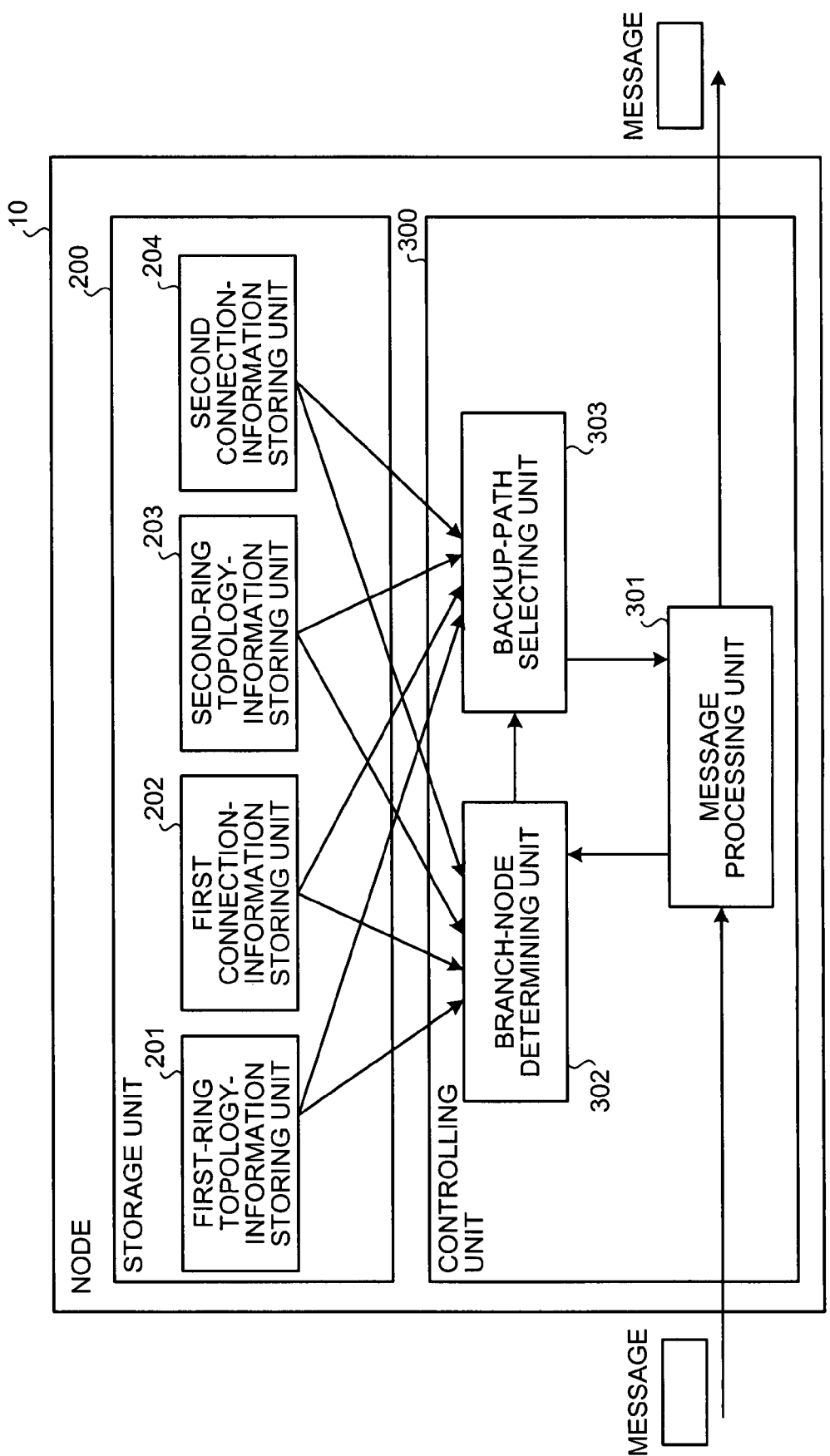

FIG.4

| TOPOLOGY INFORMATION |
|---|
| 11-12-13-14 |

FIG. 5

| RING NUMBER | CONNECTION INFORMATION |
|---|---|
| RING 2 | 12-21, 13-27 |
| . . . | . . . |
| . . . | . . . |

FIG.6

| RING NUMBER | TOPOLOGY INFORMATION |
|---|---|
| RING 2 | 21-22-23-24-25-26-27 |
| . . . | . . . |
| . . . | . . . |

FIG.7

| RING NUMBER | RING NUMBER | CONNECTION INFORMATION |
|---|---|---|
| RING 2 | RING 3 | 23-31, 24-33 |
|  | RING 4 | 25-42, 26-41 |
| . . . | . . . | . . . |

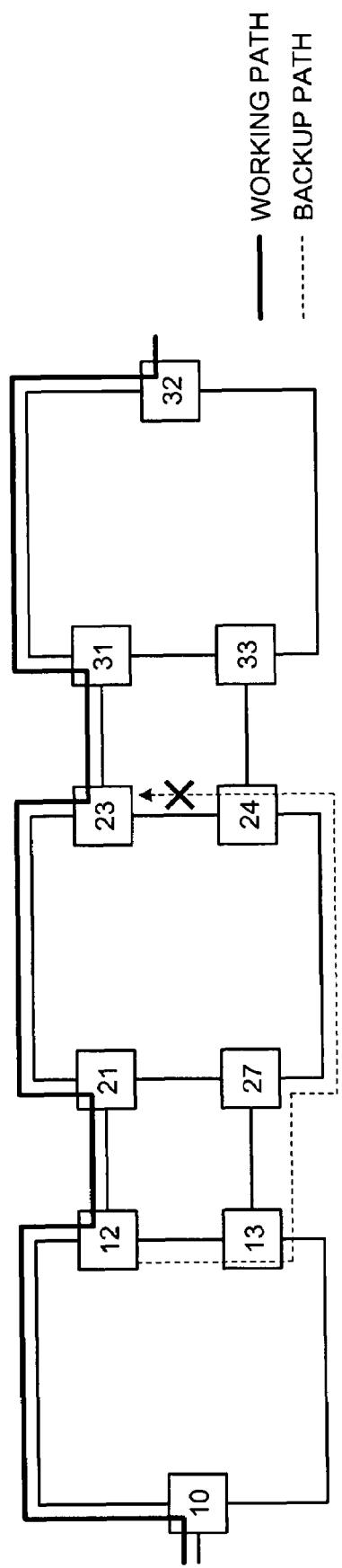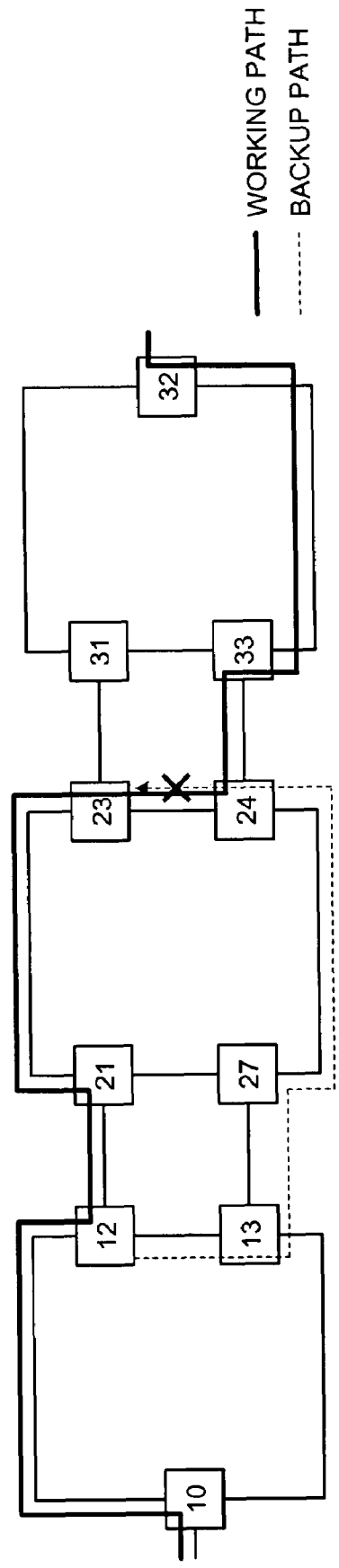

us 7,633,857 B2

NODE AND METHOD OF SETTING BACKUP PATH

BACKGROUND OF THE INVENTION

1. Field of the Invention

The present invention relates to a node and a method of setting a backup path.

2. Description of the Related Art

For example, Generalized Multi-Protocol Label Switching (GMPLS) signaling Resource ReserVation Protocol-Traffic Engineering (RSVP-TE) Extensions (RFC3473) is cited as a typical technique for path-setting by using a signaling on Synchronous Optical Network (SONET) or Synchronous Digital Hierarchy (SDH) network.

Japanese Patent Laid-Open No. 2003-101558, for example, discloses a technique that a working path and a backup path are set at the same time by a signaling on Uni-Directional Path Switched Ring (UPSR), i.e., a single ring type of SONET or SDH network. In this technique, a transmitting node transmits two signals towards a receiving node via two different paths on the ring. In other words, the transmitting node transmits one signal via one path and other signal via other path. A path switch included in the receiving node selects one of the two paths as a working path so that the other path automatically becomes a backup path.

Some networks, however, include a plurality of rings (hereinafter, "multiple-ring network"), and adjacent rings in such networks are connected via two or more paths. In such multiple-ring networks, with the conventional technique of setting a working path and a backup path by signaling, it is not possible to select a backup path and a working path at the same time from among the more than two paths existing between a transmitting node and a reception node.

Namely, RSVP-TE Extensions relates to setting paths by signaling, however, it is not define a method of setting a backup path at the same time while a working path is set by the signaling. Japanese Patent Laid-Open No. 2003-101558 discloses a method of setting a working path and a backup path in a single ring network, however, does not teach a method of setting a working path and a backup path at the same time in a multiple-ring network.

Japanese Patent Application No. 2005-209961 discloses a technique of setting a backup path at the same time as a working path in a multiple-ring network.

Specifically, in the technique disclosed in Japanese Patent Application No. 2005-209961, each of nodes composing a ring stores therein a list of the nodes (topology information of the nodes in the ring), a list of connecting nodes that are respectively connected to the same for an adjacent ring (inter-ring connecting node information), and a list of nodes composing the adjacent ring (topology information of the nodes in the adjacent ring). Based on the information, it is determined whether each of the nodes in the ring is a branch node that branches into a working path and a backup path thereon. If one of the nodes is determined as the branch node, selectable routes between the branch node and an end node on which the working path is terminated in the adjacent ring are determined as a prospective backup path unconditionally. The prospective backup path which has a shortest route is set as the backup path.

In the technique disclosed in Japanese Patent Application No. 2005-209961, the selectable routes between the branch node and the end node are determined as the prospective backup path unconditionally based on the inter-ring connecting node information or the topology information of the nodes in the adjacent ring. Thus, on the network in which two rings are connected via multiple connection paths, the backup path can be set at the same time when the working path through the two rings is set by the signaling.

In the technique disclosed in Japanese Patent Application No. 2005-209961, however, on a network in which three or more rings are respectively connected to the adjacent ring by multiple connection paths, a backup path can not be set at the same time when a working path through the three or more rings is set by a signaling.

Namely, in the technique disclosed in Japanese Patent Application No. 2005-209961, selectable routes addressed to the end node on which the working path is terminated thereon in the adjacent ring are unconditionally determined as the prospective backup path based on the topology information of the nodes in the ring, the inter-ring connecting node information, and the topology information of the nodes in the adjacent ring. Thus, in the case of the network in which three or more rings are respectively connected to the adjacent ring by multiple connection paths, the prospective backup path can not be determined at the same time when the working path through the three or more rings is set by the signaling.

Thus, there is a need of a technology with which it is possible to set, in a multiple-ring network, a working path and a backup path at the same time.

SUMMARY OF THE INVENTION

It is an object of the present invention to at least partially solve the problems in the conventional technology.

According to an aspect of the present invention, a node that sets a backup path by using a signaling for setting a working path, the node being one of a plurality of nodes referred to as a first node group that composes a first ring, a second ring including a plurality of nodes referred to as a second node group being adjacent to the first ring, a third ring including a plurality of nodes referred to as a third node group being adjacent to the second ring, the first ring and the second ring being connected to each other by a plurality of connecting nodes via a plurality of connection paths, the second ring and the third ring being connected to each other by a plurality of connecting nodes via a plurality of connection paths, any one of the connection paths between the rings being used as the working path, and any one of the connection paths between the rings other than those used as the working path being used as the backup path, includes a first-ring topology-information storing unit that stores therein topology information about the first node group; a first connection-information storing unit that stores therein connection information about the connecting nodes between the first ring and the second ring; a second-ring topology-information storing unit that stores therein topology information about the second node group; a second connection-information storing unit that stores therein connection information about the connecting nodes between the second ring and the third ring; a branch-node determining unit that when the node receives a route of the working path by a signaling, verifies the route of the working path with the topology information stored in the first-ring topology-information storing unit and the connection information stored in the first connection-information storing unit, determines whether each node in the first node group is a prospective branch node that branches into the working path and the backup path thereon, if a plurality of nodes in the first node group are determined as the prospective branch node, compares each condition of selectable routes between each of prospective branch nodes and any one of the connecting nodes in the first ring that is connected to the second ring and is not located on a route of the working path, and determines any one of the prospective branch nodes as a branch node based on a result of comparison, and if only one node in the first node group is determined as the prospective branch node, the one node is determined as the branch node; and a backup-path selecting unit that when the branch node is determined by the branch-node determining unit, compares following conditions each condition of selectable routes of the backup path between the branch node and any one of the connecting nodes in the second node group that is connected to the first ring and is located on the route of the working path; each condition of selectable routes of the backup path between the branch node and an end node that the working path ends in the second ring thereon, if the working path is terminated on the end node; and each condition of selectable routes of the backup path between the branch node and the end node, if the second connection-information storing unit stores therein no connection information between the end node and any of the connecting nodes in the third ring that is connected to the second ring, even though the working path is not terminated on the end node, and selects any one of the selectable routes as the backup path based on a result of comparison.

According to another aspect of the present invention, a method of setting a backup path on a node by using a signaling for setting a working path, the node being one of a plurality of nodes referred to as a first node group that composes a first ring, a second ring including a plurality of nodes referred to as a second node group being adjacent to the first ring, a third ring including a plurality of nodes referred to as a third node group being adjacent to the second ring, the first ring and the second ring being connected to each other by a plurality of connecting nodes via a plurality of connection paths, the second ring and the third ring being connected to each other by a plurality of connecting nodes via a plurality of connection paths, any one of the connection paths between the rings being used as the working path, and any one of the connection paths between the rings other than those used as the working path being used as the backup path, including storing topology information about the first node group in a first-ring topology-information storing unit; storing connection information about the connecting nodes between the first ring and the second ring in a first connection-information storing unit; storing topology information about the second node group in a second-ring topology-information storing unit; storing connection information about the connecting nodes between the second ring and the third ring in a second connection-information storing unit; determining including when the node receives a route of the working path by a signaling, verifies the route of the working path with the topology information stored in the first-ring topology-information storing unit and the connection information stored in the first connection-information storing unit, determining whether each node in the first node group is a prospective branch node that branches into the working path and the backup path thereon, if a plurality of nodes in the first node group are determined as the prospective branch node, comparing each condition of selectable routes between each of prospective branch nodes and any one of the connecting nodes in the first ring that is connected to the second ring and is not located on a route of the working path, and determining any one of the prospective branch nodes as a branch node based on a result of comparison, and if only one node in the first node group is determined as the prospective branch node, the one node is determined as the branch node; and selecting including when the branch node is determined at the determining, comparing following conditions each condition of selectable routes of the backup path between the branch node and any one of the connecting nodes in the second node group that is connected to the first ring and is located on the route of the working path; each condition of selectable routes of the backup path between the branch node and an end node that the working path ends in the second ring thereon, if the working path is terminated on the end node; and each condition of selectable routes of the backup path between the branch node and the end node, if the second connection-information storing unit stores therein no connection information between the end node and any of the connecting nodes in the third ring that is connected to the second ring, even though the working path is not terminated on the end node, and selecting any one of the selectable routes as the backup path based on a result of comparison.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a schematic for explaining a multiple-ring network according to a first embodiment of the present invention;

FIG. 1B is a diagram of a node shown in FIG. 1A;

FIG. 2 is a block diagram of a node shown in FIG. 1A;

FIG. 4 depicts an example of information stored in a first-ring topology-information storing unit;

FIG. 5 depicts an example of information stored in a first connection-information storing unit;

FIG. 6 depicts an example of information stored in a second-ring topology-information storing unit;

FIG. 7 depicts an example of information stored in a second connection-information storing unit;

FIG. 8A is a schematic for explaining one example of selection of a backup path by a backup-path selecting unit shown in FIG. 2;

FIG. 8B is a schematic for explaining another example of selection of a backup path by the backup-path selecting unit;

DETAILED DESCRIPTION OF THE PREFERRED EMBODIMENTS

Figure 3:
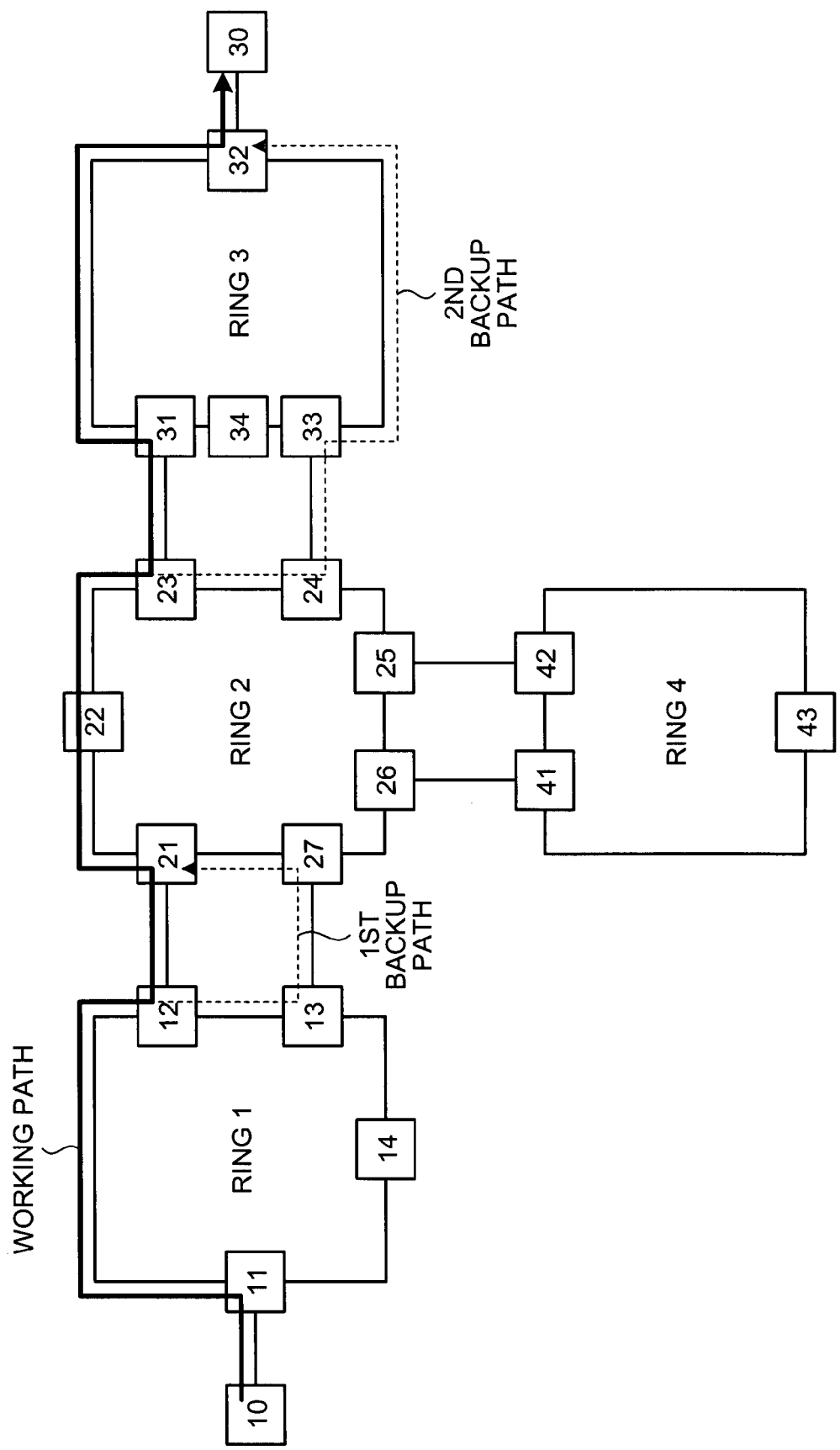
FIG. 3 is a schematic for explaining a configuration of rings that are composed by the nodes.

Exemplary embodiments of the present invention are explained in detail below with reference to the accompanying drawings.

A "ring" in the following explanation denotes a ring type of Synchronous Optical Network (SONET) or Synchronous Digital Hierarchy (SDH) network. SONET and SDH network stands for a transmission system in which bands of a plurality of low-speed communication lines are aggregated into a single optical fiber by the time-division multiplex system. The transmission system is mainly used on a backbone network held by a telecommunication company. Specifically, multiplexing equipment, so-called a "node", is connected to a communication apparatus and it time-divisionally multiplexes data transmitted from the communication apparatus and then transmits the time-divisionally multiplexed data to other node attached to the fiber-optic network. The communication apparatus can be a telephone exchange, leased-line equipment, or an Asynchronous Transfer Mode (ATM) exchange. Namely, the "ring" denotes a ring-like fiber-optic network composed by a plurality of nodes, and employs SONET or SDH network as the transmission system.

Generally, a ring is connected to an adjacent ring via two connection paths. In case a failure occurs on one of the connection paths, the other connection path is used to perform communication so that communication can be continued without interruption. Such a system is called Uni-Directional Path Switched Ring (UPSR) or Bidirectional Line Switched Ring (BLSR). In a UPSR network, a transmitting node usually transmits same data in both directions of the ring. One direction of the ring is used as a working path, and the other direction is used as a backup path. If a failure occurs on the working path, a receiving node switches paths to the backup path to receive the data.

On the other hand, in a BLSR network, a transmitting node usually transmits data only in a direction of the working path. If a failure occurs on the working path, the data is turned back, while avoid the failure zone, and transmitted via the other path, i.e., the backup path. Thus, switching of the working path to the backup path in the single ring is different in UPSR and BLSR.

Some networks are single ring networks while others are multiple-ring networks. Even in a multiple-ring network, it is preferable that adjacent rings are connected via two (or more) connection paths so that if a failure occurs on one of the connection paths, some other connection path can be used as a backup connection path. Of the two (or multiple) connection paths, a usually-used connection path is denoted as a "working path", and the other connection path used when a failure occurs on the usually-used connection path is denoted as a "backup path". A method of setting the working path and the backup path is defined on the BLSR network (for example, by the Drop-and-Continue method or the Dual Transmit method). However, a method of setting the backup path by a signaling (i.e., by exchanging signals with a communicating target to set a path onto the communicating target) is not defined on the BLSR network. In a technique according to the embodiments described below, the backup path can be set by the signaling on the BLSR multiple-ring network.

A network according to the embodiments is not limited to the BLSR network in which a plurality of rings connected by two connection paths. The embodiments are also applicable to, for example, a network in which a plurality of rings is connected via three connection paths if a working path can be switched to a backup path in the same manner as the BLSR network.

A node according to a first embodiment is described with reference to FIGS. 1A and 1B. FIG. 1A is a schematic for explaining a configuration of an exemplary network according to the first embodiment. FIG. 1B is a diagram of a node in the network shown in FIG. 1A.

In the network shown in FIG. 1A, a first ring (ring 2) composed by a plurality of nodes is connected to two second rings (rings 1 and 3), which are adjacent to the first ring, composed by a plurality of different nodes via two connection paths respectively. One of the connection paths is set as a working path by a signaling, and the other connection path is set as a backup path by using the signaling for setting the working path. On a network in which three (or more) rings are respectively connected to the adjacent ring by multiple connection paths, the backup path can be set at the same time when the working path running through the three (or more) rings is set by the signaling.

As shown in FIG. 1A, three rings 1, 2, and 3 are respectively composed by a plurality of nodes. The ring 1 is composed by nodes 11 to 14, the ring 2 is composed by nodes 21 to 27, and the ring 3 is composed by nodes 31 to 34. A node 10, which is a transmission node, is connected to the node 11 in the ring 1 via a connection path. The node 32 in the ring 3 is connected to a node 30, which is a reception node, via a connection path. The ring 1 is connected to the ring 2 via two connection paths between the nodes 12 and 21, and the nodes 13 and 27. The ring 2 is connected to the ring 3 via two connection paths between the nodes 23 and 31, and the nodes 24 and 33. The node 23 in the ring 2 is described as an example. The ring 2 including the target node 23 is denoted as a first ring, and the nodes 21 to 27 composing the first ring are denoted as a first node group. The rings 1 and 3, which are adjacent to the first ring (the ring 2), are denoted as second rings, and the nodes 11 to 14 and 31 to 34, which compose the second rings, are denoted as second node groups. The working path runs through the nodes "10-11-12-21-22-23-31-32-30" in that order as indicated by the heavy line.

Each of the nodes includes a first-ring topology-information storing unit, a first connection-information storing unit, a second-ring topology-information storing unit, and a second connection-information storing unit. The first-ring topology-information storing unit stores therein topology information of the first node group. The first connection-information storing unit stores therein connection information about connecting nodes between the first ring and the second rings. The second-ring topology-information storing unit stores therein topology information of the second node groups. The second connection-information storing unit stores therein connection information about connecting nodes between the second ring and a third ring (not shown) adjacent to the second ring.

As shown in FIG. 1B, the first-ring topology-information storing unit in the node 23 stores therein "21-22-23-24-25-26-27" as the topology information of the first node group (in the ring 2). The first connection-information storing unit in the node 23 stores therein "12-21, 13-27, 23-31, 24-33" as the connection information about connecting nodes between the first ring (the ring 2) and the second rings (the rings 1 and 3). The second-ring topology-information storing unit in the node 23 stores therein "11-12-13-14" and "31-32-33-34" as the topology information of the second node groups (in the rings 1 and 3). The second connection-information storing unit in the node 23 stores therein no connection information because it is assumed that there is no ring adjacent to the second rings. If there is a ring adjacent to the second rings, however, the second connection-information storing unit in the node 23 stores therein connection information of the adjacent ring.

Processing procedures performed by the node 23 are described below with reference to FIG. 1B.

First, the node 23 receives "10-11-12-21-22-23-31-32-30" as a route of the working path by the signaling (see (1) in FIG. 1B).

Upon receiving the route of the working path, the node 23 verifies the received route with the topology information stored in the first-ring topology-information storing unit and the connection information stored in the first connection-information storing unit, and determines whether the node 23 is a prospective branch node (see (2) in FIG. 1B). Then, a branch node is determined from prospective branch nodes (see (3) in FIG. 1B).

Specifically, the node 23 verifies "21-22-23" as the route of the working path with "21-22-23" as the topology information and "12-21, 23-31" as the connection information. If the node 23 is an end node in the first ring (the ring 2), i.e., if the working path is terminated on the node 23 in the first ring, and also if the first connection-information storing unit stores therein any connection information, and also if the working path runs through any one of connecting nodes(the nodes 23 and 24) in the first ring, which are connected to the second ring (the ring 3) in the end node side, and also if the first connection-information storing unit stores therein connection information between the node 21, which is a start node of the working path in the first ring (the ring 2), and a connecting node in the second ring (in this case, "12-21" as the connection information), the node 23 is determined as the branch node.

In the network shown in FIG. 1A, only the node 23 is determined as the prospective branch node, and the other nodes in the first ring (the ring 2) are not determined as the prospective branch node. Therefore, the node 23 can be determined as the branch node. If a plurality of nodes is determined as the prospective branch node, conditions of routes between each of the prospective branch nodes and a connecting node on a route of the backup path in the first ring are compared. Any one of the prospective branch nodes, which has a best condition, e.g., has a shortest route, is determined as the branch node based on the comparison result.

When the branch node is determined, following conditions are compared to select a route of the backup path:

each condition of selectable routes between the branch node and a connecting node in the second ring that is located on the route of the working path;

if the working path is terminated on an end node in the second ring, each condition of selectable routes between the branch node and the end node; and if the working path is not terminated on the end node in the second ring, and also if the second connection-information storing unit stores therein no connection information between the end node in the second ring and a connecting node in the third ring, each condition of selectable routes between the branch node and the end node in the second ring. Then, any one of the selectable routes, which has a best condition, is selected as the backup path based on the comparison result (see (4) in FIG. 1B).

For example, as shown in FIG. 1A, of the connecting nodes 31 and 33 in the second ring (the ring 3) that are respectively connected to the connecting nodes 23 and 24 in the first ring (the ring 2), the working path runs through the node 31. The working path is not terminated on the end node (the node 32) in the second ring (the ring 3). The second connection-information storing unit stores therein no connection information between the end node 32 and the third ring. In this case, a selectable route between the branch node 23 and the connecting node 31 is "23-24-33-34-31" (four hops). A selectable route between the branch node 23 and the end node 32 is "23-24-33-32" (three hops). The route "23-24-33-32" has fewer hops than the route "23-24-33-34-31". Therefore, the route "23-24-33-32" is selected as the backup path based on the comparison result (fewer hops).

Therefore, the node 23 sets "23-24-33-32" as the backup path by using the signaling that was performed for setting the working path (see (5) in FIG. 1B).

As described above, the node according to the first embodiment determines whether the end node in the adjacent ring (the second ring) on which the working path ends in the second ring is a connecting node that is connected to the third ring, i.e., whether the end node belongs to two rings. If the end node is not connected to the third ring, i.e., if the end node does not belong to two rings, a route addressed to the end node is determined as the prospective backup path. Therefore, on the network in which three or more rings are respectively connected to the adjacent ring via multiple connection paths, the backup path can be selected from the multiple connection paths except for the one for the working path at the same time when the working path through the three or more rings is set by the signaling. Namely, it is possible to set both the working path and the backup path at the same time by signaling.

Figure 9:
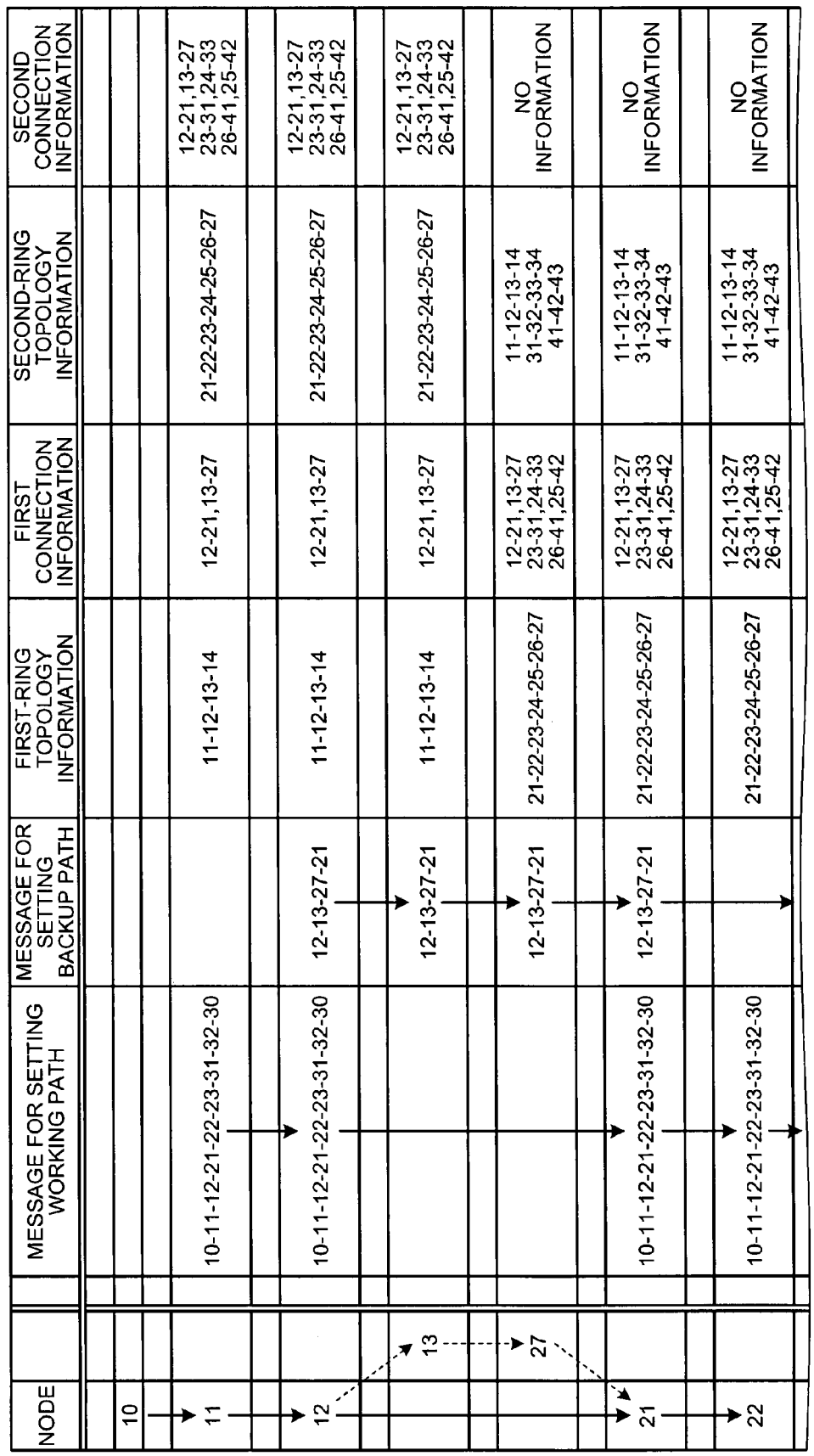
FIG. 9 is a diagram for explaining a signaling.
Figure 10:
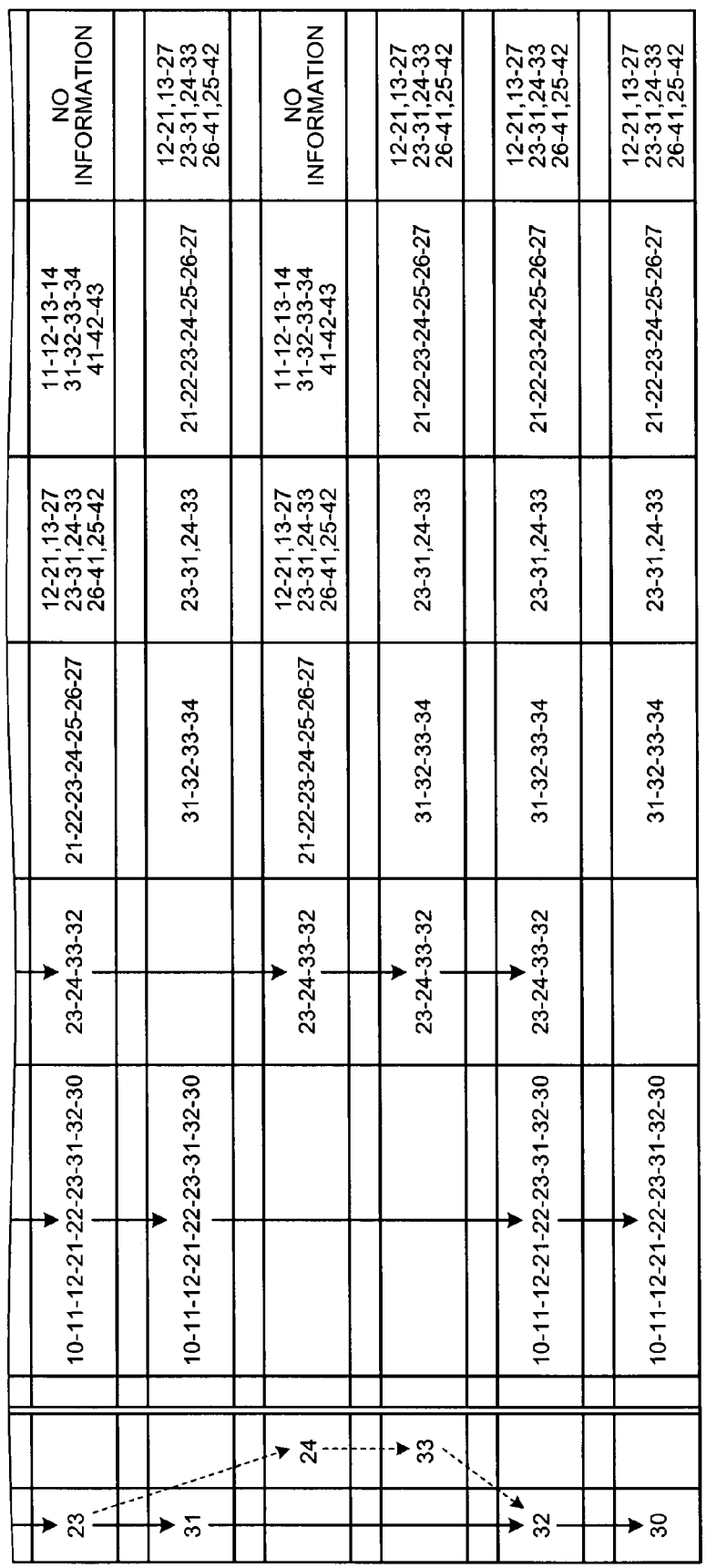
FIG. 10 is a continuation of FIG. 9.

The configuration of a node according to the first embodiment is described in detail below with reference to FIGS. 2 to 10. FIG. 2 is a block diagram of the node 10. FIG. 3 is a schematic for explaining a configuration of rings that are composed by the nodes. FIG. 4 depicts an example of information stored in the first-ring topology-information storing unit. FIG. 5 depicts an example of information stored in the first connection-information storing unit. FIG. 6 depicts an example of information stored in the second-ring topology-information storing unit. FIG. 7 depicts an example of information stored in the second connection-information storing unit. FIG. 8A is a schematic for explaining one example of selection of a backup path by a backup-path selecting unit, and FIG. 8B is a schematic for explaining another example of selection of a backup path by the backup-path selecting unit. FIG. 9 is a diagram for explaining a signaling. FIG. 10 is a continuation of the diagram shown in FIG. 9.

As shown in FIG. 2, the node 10 includes a storage unit 200 and a controlling unit 300. The other nodes shown in FIG. 1A have the same or similar configuration as the node 10.

The storage unit 200 stores therein data that is required for processes executed by the controlling unit 300. The storage unit 200 includes a first-ring topology-information storing unit 201, a first connection-information storing unit 202, a second-ring topology-information storing unit 203, and a second connection-information storing unit 204. The first-ring topology-information storing unit in claims corresponds to, for example, the first-ring topology-information storing unit 201. The first connection-information storing unit in claims corresponds to, for example, the first connection-information storing unit 202. The second-ring topology-information storing unit in claims corresponds to, for example, the second-ring topology-information storing unit 203. The second connection-information storing unit in claims corresponds to, for example, the second connection-information storing unit 204.

The controlling unit 300 executes each process by controlling the node 10. The controlling unit 300 includes a message processing unit 301, a branch-node determining unit 302, and a backup-path selecting unit 303. The branch-node determining unit in claims corresponds to, for example, the branch-node determining unit 302. The backup-path selecting unit in claims corresponds to, for example, the backup-path selecting unit 303.

The first-ring topology-information storing unit 201 stores therein topology information of plurality of nodes (hereinafter, "a first node group") composing the first ring (ring 2). Specifically, the topology information of the first node group is stored in the first-ring topology-information storing unit 201 in advance by a manual input from an administrator of the network or the node, by using the Network Management System (NMS) or the Element Management System (EMS) that are provided by a management center, or by a method advertised in any one of protocols. However, any other input method can be used. The topology information stored in the first-ring topology-information storing unit 201 is required for processes executed by the branch-node determining unit 302 and the backup-path selecting unit 303.

For example, as shown in FIG. 3, a plurality of nodes respectively composes four rings (rings 1, 2, 3, and 4). Each of the rings 1 to 4 is connected to the adjacent ring via two connection paths respectively. A working path runs through the rings 1, 2, and 3. The ring 1 is composed by the nodes 11 to 14. Therefore, the first-ring topology-information storing unit 201 in each of the nodes 11 to 14 stores therein "11-12-13-14" as the topology information of the first ring (see FIG. 4).

The first connection-information storing unit 202 stores therein connection information about connecting nodes between the first ring and a second ring that is adjacent to the first ring and composed by a plurality of nodes (hereinafter, "a second node group"). Specifically, the connection information is stored in the first connection-information storing unit 202 in advance, in the same manner as the first-ring topology-information storing unit 201, by a manual input from an administrator of the network or the node, by using the Network Management System (NMS) or the Element Management System (EMS) that are provided by a management center, or by a method advertised in any one of protocols. The connection information stored in the first connection-information storing unit 202 is required for processes executed by the branch-node determining unit 302 and the backup-path selecting unit 303.

For example, as shown in FIG. 5, the first connection-information storing unit 202 in each of the nodes 11 to 14 in the ring 1 stores therein "12-21, 13-27" associated with "the ring 2" as the connection information about connecting nodes between the rings 1 and 2. Namely, the ring 1 and the ring 2 are connected via two connection paths between the nodes 12 and 21 and between the nodes 13 and 27.

The second-ring topology-information storing unit 203 stores therein topology information of the second node group. Specifically, the topology information of the second node group is stored in the second-ring topology-information storing unit 203 in advance, in the same manner as the first-ring topology-information storing unit 201, by a manual input from an administrator of the network or the node, by using the Network Management System (NMS) or the Element Management System (EMS) that are provided by a management center, or by a method advertised in any one of protocols. The topology information stored in the second-ring topology-information storing unit 203 is required for processes executed by the branch-node determining unit 302 and the backup-path selecting unit 303.

For example, as shown in FIG. 6, the second-ring topology-information storing unit 203 in each of the nodes 11 to 14 in the ring 1 stores therein "21-22-23-24-25-26-27" associated with "the ring 2" as the topology information of the second ring.

If the second ring is further connected to a third ring, the second connection-information storing unit 204 in each of the nodes 11 to 14 in the ring 1 stores therein connection information about connecting nodes between the second ring and the third ring. Specifically, the connection information is stored in the second connection-information storing unit 204 in advance, in the same manner as the first-ring topology-information storing unit 201, by a manual input from an administrator of the network or the node, by using the Network Management System (NMS) or the Element Management System (EMS) that are provided by a management center, or by a method advertised in any one of protocols, if there is the third ring adjacent to the second ring. The connection information stored in the second connection-information storing unit 204 is required for processes executed by the branch-node determining unit 302 and the backup-path selecting unit 303.

For example, as shown in FIG. 7, the second connection-information storing unit 204 in each of the nodes 11 to 14 in the ring 1 stores therein "23-31, 24-33" associated with "the rings 2 and 3" and "25-42, 26-41" associated with "the rings 2 and 4" as the connection information about connecting nodes between the second ring and the third ring. Namely, the ring 2 and the ring 3 are connected via two connection paths between the nodes 23 and 31 and between the nodes 24 and 33. The ring 2 and the ring 4 are connected via two connection paths between the nodes 25 and 42 and between the nodes 26 and 41.

The message processing unit 301 processes a message for setting the working path by a signaling, a message for setting the backup path by a signaling, and a message, i.e., data to be transmitted or received via the working path or the backup path. Specifically, if the message processing unit 301 receives a message for setting the working path by a signaling from the adjacent node, the message processing unit 301 forwards the message to the other adjacent side of the node on the working path, or transmits the message to the branch-node determining unit 302 or the backup-path selecting unit 303 depending on an instruction included in the message. If the message processing unit 301 receives a message for setting the backup path by a signaling from the adjacent node or the backup-path selecting unit 303, the message processing unit 301 forwards the message to the other adjacent side of the node on the backup path depending on an instruction included in the message. After the working path and the backup path are set by the signaling, if the message processing unit 301 receives a message (data to be received or transmitted) from the adjacent node on the working path or the backup path, the message processing unit 301 forwards the message (the data) to the other adjacent side of the node on the working path or the backup path.

For example, the message processing unit 301 in any node on the working path forwards "10-11-12-21-22-23-31-32-30" as the message for setting the working path to the adjacent node on the working path, or transmits the message to the branch-node determining unit 302 or the backup-path selecting unit 303.

Upon receiving the route of the working path by the signaling, the branch-node determining unit 302 determines whether each of the first node-group is a prospective branch node. Based on the determination results, the branch-node determining unit 302 determines any one of the prospective branch nodes as a branch node that branches into the working path and the backup path. Specifically, upon receiving the route of the working path (the message for setting the working path) from the message processing unit 301, the branch-node determining unit 302 determines whether each of the first node group is a prospective branch node, and further determines any one of the prospective branch nodes as a branch node based on the determination results. Then, the branch-node determining unit 302 transmits the determination result (information of the branch node) to the backup-path selecting unit 303.

Procedures performed by the branch-node determining unit 302 when determining the prospective branch node and the branch node are described in detail below. Upon receiving the route of the working path from the message processing unit 301, the branch-node determining unit 302 verifies the route of the working path with the topology information stored in the first-ring topology-information storing unit 201 and the connection information stored in the first connection-information storing unit 202, and determines whether each of the first node group is the prospective branch node. If a plurality of nodes are determined as the prospective branch node (a determination result 1), the branch-node determining unit 302 compares each condition of selectable routes between each of the prospective branch nodes and a connecting node in the first ring on which the working path does not run, and determines any one of the prospective branch nodes, which has a best condition, as the branch node based on the comparison result. If only one node is determined as the prospective branch node (a determination result 2), the branch-node determining unit 302 determines the prospective branch node as the branch node.

More specifically, if the target node in the first node group, which verifies the route of the working path with the topology information and the connection information, is a start node (an add node) of the working path in the first ring, and also if the first connection-information storing unit 202 stores therein no connection information between the target node and the second ring, i.e., if the target node does not belong to two rings, and also if the first connection-information storing unit 202 stores therein connection information between an end node (a drop node) of the working path in the first ring and the second ring, i.e., if the end node (the drop node) in the first ring belongs to two rings, and also if the working path does not run through both of the connecting nodes that connect to the second ring in the end node side (in the drop node side), the branch-node determining unit 302 determines the target node as the prospective branch node.

The branch-node determining unit 302 further determines whether each of other nodes in the first node group is the prospective branch node. If any other node in the first node group is also determined as the prospective branch node (the determination result 1), the branch-node determining unit 302 compares each condition of selectable routes between each of the prospective branch nodes and the connecting node in the first ring on which the working path does not run. The branch-node determining unit 302 determines any one of the prospective branch nodes as the branch node based on the comparison result.

For example, each condition of selectable routes is compared based on the number of hops between the connecting node and each of the prospective branch node. Any one of the prospective branch nodes, which has fewer hops, is determined as the branch node. As described above, in the first embodiment, each condition is compared by, but not limited to, the number of hops. It is also applicable to compare each condition based on such as a distance of the route, a band vacancy of the route (for example, the number of unused channels), a usage fee of the route, or a policy (for example, to give priority to the drop-and-continue).

If the target node in the first node group is a connecting node that is connected to the second ring in the end node side (in the drop node side) of the first ring, and also if the first connection-information storing unit 202 in the target node stores therein connection information between the target node and the second ring, i.e., if the target node belongs to two rings, and also if the working path does not run through both of the connecting nodes that are connected to the second ring in the end node side (in the drop node side) of the first ring, and also if the first connection-information storing unit 202 stores therein no connection information between a start node (an add node) on which the working path starts in the first ring and the second ring, i.e., if the start node (the add node) does not belong to two rings, the branch-node determining unit 302 determines the target node (the node to be determined) in the first ring as the prospective branch node.

The branch-node determining unit 302 further determines whether each of other nodes in the first node group is the prospective branch node. If any other node in the first node group is also determined as the prospective branch node (the determination result 1), the branch-node determining unit 302 compares each condition of the prospective branch nodes in the same manner as described above. Then, the branch-node determining unit 302 determines any one of the prospective branch nodes as the branch node based on the comparison result.

If the target node (the node to be determined) in the first node group is a connecting node that is connected to the second ring in the end node side (in the drop node side) of the first ring, and also if the first connection-information storing unit 202 in the target node stores therein connection information between the target node and the second ring, i.e., if the target node belongs to two rings, and also if the working path does not run through both of the connecting nodes that are connected to the second ring in the end node side (in the drop node side) of the first ring, and also if the first connection-information storing unit 202 stores therein connection information between a start node (an add node) on which the working path starts in the first ring and the second ring, i.e., if the start node (the add node) belongs to two rings, the branch-node determining unit 302 determines the target node (the node to be determined) in the first node group as the branch node. At the same time, the branch-node determining unit 302 can determine that other nodes in the first node group are not the branch node (the determination result 2).

If the target node (the node to be determined) in the first node group is a connecting node that is connected to the second ring in the end node side (in the drop node side) of the first ring, and also if the first connection-information storing unit 202 in the target node stores therein connection information between the target node and the second ring, i.e., if the target node belongs to two rings, and also if the working path runs through both of the connecting nodes that are connected to the second ring in the end node side (in the drop node side) of the first ring, and also if the target node is not the end node (the drop node) on which the working path ends in the first ring, the branch-node determining unit 302 determines the target node (the node to be determined) in the first node group as the branch node. At the same time, the branch-node determining unit 302 can determine that other nodes in the first node group are not the branch node (the determination result 2).

The backup-path selecting unit 303 compares each condition of selectable routes of the backup path, and selects any one of the selectable routes as the backup path based on the comparison result. Specifically, upon receiving the determination of the branch node from the branch-node determining unit 302, the backup-path selecting unit 303 compares each condition of selectable routes between the branch node and a prospective destination node of the backup path. The backup-path selecting unit 303 selects any one of the selectable routes as the backup path based on the comparison result, and transmits the selected route of the backup path to the message processing unit 301.

Procedures performed by the backup-path selecting unit 303 when selecting the backup path are described in detail below. The prospective destination node of the backup path denotes a prospective node on which the backup path is terminated. The prospective destination node is determined by the Drop-and-Continue method or the Dual Transmit method that are defined in the BLSR. Referring to FIGS. 8A and 8B, when the node 12 is the branch node, the node 23 can not be selected as the prospective destination node of the backup path as defined in the BLSR.

Namely, the node 23 is an end node (a drop node) on which the working path ends in the second ring, but the node 23 is connected to a third ring (23-31), i.e., the node 23 belongs to two rings. Therefore, the node 23 can not be selected as the prospective destination node of the backup path.

The backup-path selecting unit 303 determines whether the second connection-information storing unit 204 stores therein connection information between the ends node (the drop node) in the second ring and the third ring. Based on the determination result, the backup-path selecting unit 303 determines whether the ends node (the drop node) is the prospective destination node. Namely, the backup-path selecting unit 303 determines any one of connecting nodes in the second ring that is connected to the first ring and also the working path runs therethrough as the prospective destination node. If the working path is terminated on the end node (the drop node) in the second ring, the backup-path selecting unit 303 determines the end node (the drop node) as the prospective destination node. If the working path is not terminated on the end node (the drop node) in the second ring, and also if the second connection-information storing unit 204 stores therein no connection information between the end node (the drop node) and the third ring, i.e., the end node (the drop node) does not belong to two rings, the backup-path selecting unit 303 determines the end node (the drop node) as the prospective destination node.

Then, the backup-path selecting unit 303 compares each condition of selectable routes between the branch node and the prospective destination node, and determines any one of the selectable routes as the backup path based on the comparison result. For example, the backup-path selecting unit 303 compares the number of hops of the selectable routes between the branch node and the prospective destination node, and determines any one of the selectable routes, which has fewer hops, as the backup path. As described above, in the first embodiment, each condition is compared by, but not limited to, the number of hops. It is also applicable to compare each condition based on such as a distance of the route, a band vacancy of the route (for example, the number of unused channels), a usage fee of the route, or a policy (for example, to give priority to the drop-and-continue).

A signaling according to the first embodiment is described in detail below with reference to FIGS. 9 and 10. Here are described, in the configuration of the rings 1 to 4 as shown in FIG. 3, which node transmits a message for setting the working path or the backup path by the signaling, and which node receives the message, and what kinds of information each node stores therein, and how the branch-node determining unit 302 in each node determines a branch node, and then how the backup-path selecting unit 303 in each node selects the backup path. For setting the working path or the backup path, the node 10 transmits the signaling to the node 30, and then, actually, the node 30 returns back the signaling to the node 10. However, descriptions of the signaling returned back from the node 30 to the node 10 are omitted. A timing of transmitting the signaling is not limited to the same as shown in FIGS. 9 and 10.

The first-ring topology-information storing unit 201, the first connection-information storing unit 202, the second-ring topology-information storing unit 203, and the second connection-information storing unit 204 in each of the nodes 11, 12, 13, 27, 21, 22, 23, 31, 24, 33, and 32 store therein information as shown in FIGS. 3, 9, and 10.

Processing procedures performed by the node 11 is described below. Upon receiving "10-11-12-21-22-23-31-32-30" as the message for setting the working path (the route of the working path) from the node 10, the message processing unit 301 in the node 11 transmits the route of the working path to the node 12 and the branch-node determining unit 302 in the node 11.

Upon receiving the route of the working path from the message processing unit 301, the branch-node determining unit 302 verifies the route of the working path with topology information stored in the first-ring topology-information storing unit 201 and connection information stored in the first connection-information storing unit 202, and determines whether the node 11 is a prospective branch node.

Namely, the branch-node determining unit 302 in the node 11 verifies the route of the working path ("11-12") with the topology information ("11-12") and the connection 37. information ("12-21, 13-27"). In this case, the node 11 is a start node (an add node) in the ring 1, and does not belong to two rings. The node 12 is an end node (a drop node) in the ring 1, and belongs to two rings (the rings 1 and 2). The working path does not run through both of connecting nodes in the end node side (in the drop node side) of the ring 1 (the nodes 12 and 13). Therefore, the branch-node determining unit 302 determines the node 11 is the prospective branch node.

The branch-node determining unit 302 in the node 11 further determines whether each of the other nodes composing the first ring (the ring 1) is the prospective branch node. Then, the node 12 is determined as the prospective branch node. Of the connecting nodes (the nodes 12 and 13) in the end node side (in the drop node side) of the first ring (the ring 1), the working path runs through the node 12. Therefore, the node 13 is selected as a route of the backup path. The branch-node determining unit 302 compares the number of hops between the node 13 and each of the prospective branch nodes (the nodes 11 and 12), and determines the node 12, which has fewer hops, as the branch node based on the comparison result. The node 11 finishes processing because the node 11 is not determined as the branch node.

Processing procedures performed by the node 12 is described below. Upon receiving "10-11-12-21-22-23-31-32-30" as the message for setting the working path (the route of the working path) from the node 11, the message processing unit 301 in the node 12 transmits the route of the working path to the node 21 and the branch-node determining unit 302 in the, node 12.

Upon receiving the route of the working path from the message processing unit 301, the branch-node determining unit 302 in the node 12 verifies the route of the working path with topology information stored in the first-ring topology-information storing unit 201 and connection information stored in the first connection-information storing unit 202, and determines whether the node 12 is a prospective branch node.

Namely, the branch-node determining unit 302 in the node 12 verifies the route of the working path ("11-12") with the topology information ("11-12") and the connection information ("12-21, 13-27"). In this case, the node 12 is a connecting node that is connected to the second ring (the ring 2) in the end node side (in the drop node side) of the first ring (the ring 1), i.e., the node 12 belongs to two rings (the rings 1 and 2). The working path does not run through both of connecting nodes (the nodes 12 and 13) that are connected to the second ring (the ring 2) in the end node side (in the drop node side) of in the first ring (the ring 1). The node 11, which is the start node (the add node) in the first ring (the ring 1), does not belong to two rings (the rings 1 and 2). Therefore, the branch-node determining unit 302 determines the node 12 is the prospective branch node.

The branch-node determining unit 302 in the node 12 further determines whether each of the other nodes composing the first ring (the ring 1) is the prospective branch node. The node 11 is determined as the prospective branch node. The branch-node determining unit 302 compares the number of hops between the node 13 and each of the prospective branch nodes (the nodes 11 and 12), and determines the branch node based on the comparison result (fewer hops).

The number of hops between the node 11 and the node 13 ("11-14-13") is two hops. The number of hops between the node 12 and the node 13 ("12-13") is one hop. Therefore, the branch-node determining unit 302 determines the node 12 as the branch node, and transmits the determination result to the backup-path selecting unit 303 in the node 12.

Upon receiving the determination result of the branch node from the branch-node determining unit 302, the backup-path selecting unit 303 in the node 12 compares the number of hops of selectable routes between the node 12 and the prospective destination node of the backup path. The branch-node determining unit 302 determines any one of the selectable routes, which has fewer hops, as the route of the backup-path.

Namely, the backup-path selecting unit 303 in the node 12 verifies the route of the working path "21" and the connection information "12-21". Of connecting nodes (the nodes 21 and 27) that are connected to the first ring (the ring 1) in the start node side (in the add node side) of the second ring (the ring 2), the working path runs through the node 21. Therefore, the backup-path selecting unit 303 determines the node 21 as the prospective destination node. Also, the backup-path selecting unit 303 verifies the route of the working path "21-22-23-31" with the topology information "21-22-23-24" and the connection information "23-31", and determines that the working path is not terminated on the end node 23 in the second ring (the ring 2), i.e., the node 23 belongs to two rings (the ring 2 and 3). Therefore, the node 23 is not determined as the prospective destination node. As a result, only the node 21 is determined as the prospective destination node.

The backup-path selecting unit 303 in the node 12 compares the number of hops of selectable routes between the node 21 and the node 12, and selects any one of the selectable routes, which has fewer hops, as the backup path. In this case, the selectable route is only a route "12-13-27-21", so that the route "12-13-27-21" is consequently selected as the backup path. The backup-path selecting unit 303 in the node 12 transmits the route of the backup path to the message processing unit 301 in the node 12. The message processing unit 301 in the node 12 transmits the route of the backup path to the node 13. The node 13 transmits the route of the backup path to the node 27. Then, the node 27 transmits the route of the backup path to the node 21. The backup path is connected to the working path on the node 21 by the signaling.

Processing procedures performed by the node 21 is described below. Upon receiving "10-11-12-21-22-23-31-32-30" as the message for setting the working path (the route of the working path) from the node 12, the message processing unit 301 in the node 21 transmits the route of the working path to the node 22 and the branch-node determining unit 302 in the node 21 in the same manner as the node 11.

Upon receiving the route of the working path from the message processing unit 301, the branch-node determining unit 302 in the node 21 verifies the route of the working path with the topology information and the connection information in the same manner as the node 11. The branch-node determining unit 302 determines whether the node 21 is a prospective branch node. In this case, the node 21 is not determined as the prospective branch node. Therefore, the node 21 finishes processing.

In the same manner as described above, upon receiving the route of the working path from the node 21, the message processing unit 301 in the node 22 transmits the route of the working path to both the node 23 and the branch-node determining unit 302 in the node 22. In this case, the node 22 is not determined as the prospective branch node. Therefore, the node 22 finishes processing.

Processing procedures performed by the node 23 is described below. Upon receiving "10-11-12-21-22-23-31-32-30" as the route of the working path from the node 22, the message processing unit 301 in the node 23 transmits the route of the working path to the node 31 and the branch-node determining unit 302 in the node 23.

Upon receiving the route of the working path from the message processing unit 301, the branch-node determining unit 302 in the node 23 verifies the route of the working path with the topology information and the connection information in the same manner as the node 11. The branch-node determining unit 302 determines whether the node 23 is a prospective branch node.

Namely, the branch-node determining unit 302 in the node 23 verifies the route of the working path "21-22-23" with the topology information "21-22-23" and the connection information "12-21, 23-31". In this case, the node 23 is a connecting node that is connected to the ring 3 in the end node side (in the drop node side) of the ring 2, i.e., the node 23 belongs to two rings (the rings 2 and 3). The working path does not run through both of connecting nodes (the nodes 23 and 24) that are connected to the ring 3 in the end node side (in the drop node side) of the ring 2. The node 21, which is the start node (the add node) in the ring 2, belongs to two rings (the rings 1 and 2). Therefore, the branch-node determining unit 302 determines the node 23 as the branch node. Then, the branch-node determining unit 302 in the node 23 transmits the determination result of the branch node to the backup-path selecting unit 303 in the node 23.

Upon receiving the determination result of the branch node (the node 23) from the branch-node determining unit 302, the backup-path selecting unit 303 in the node 23 compares the number of hops of selectable routes between the node 23 and a prospective destination node of the backup path. The backup-path selecting unit 303 determines any one of the selectable routes, which has fewer hops, as the backup path.

Namely, the backup-path selecting unit 303 in the node 23 verifies the route of the working path "31" and the connection information "23-31". Of connecting nodes (the nodes 31 and 33) that are connected to the ring 2 in the start node side (in the add node side) of the ring 3, the working path runs through the node 31. Therefore, the backup-path selecting unit 303 determines the node 31 as the prospective destination node. Then, the backup-path selecting unit 303 verifies the route of the working path "31-32-30" with the topology information "31-32-33" and the connection information "no information", and determines that the working path is not terminated on the node 32 that is the end node (the drop node) in the second ring (the ring 3), i.e., the node 32 does not belong to two rings. Therefore, the node 32 is determined as the prospective destination node. The nodes 31 and 32 are determined as the prospective destination node.

A selectable route of the backup path between the node 23 and the node 31 is only a route "23-24-33-34-31" (four hops). A selectable route of the backup path between the node 23 and the node 32 is only a route "23-24-33-32" (three hops). Therefore, the backup-path selecting unit 303 selects the route "23-24-33-32", which has fewer hops, as the backup path.

The backup-path selecting unit 303 in the node 23 transmits the route of the backup-path "23-24-33-32" to the message processing unit 301 in the node 23. The message processing unit 301 in the node 23 transmits the route of the backup-path to the node 24. The node 24 transmits the route of the backup-path to the node 33. The node 33 transmits the route of the backup-path to the node 32. The backup path is connected to the working path on the node 32 by the signaling.

Figure 11:
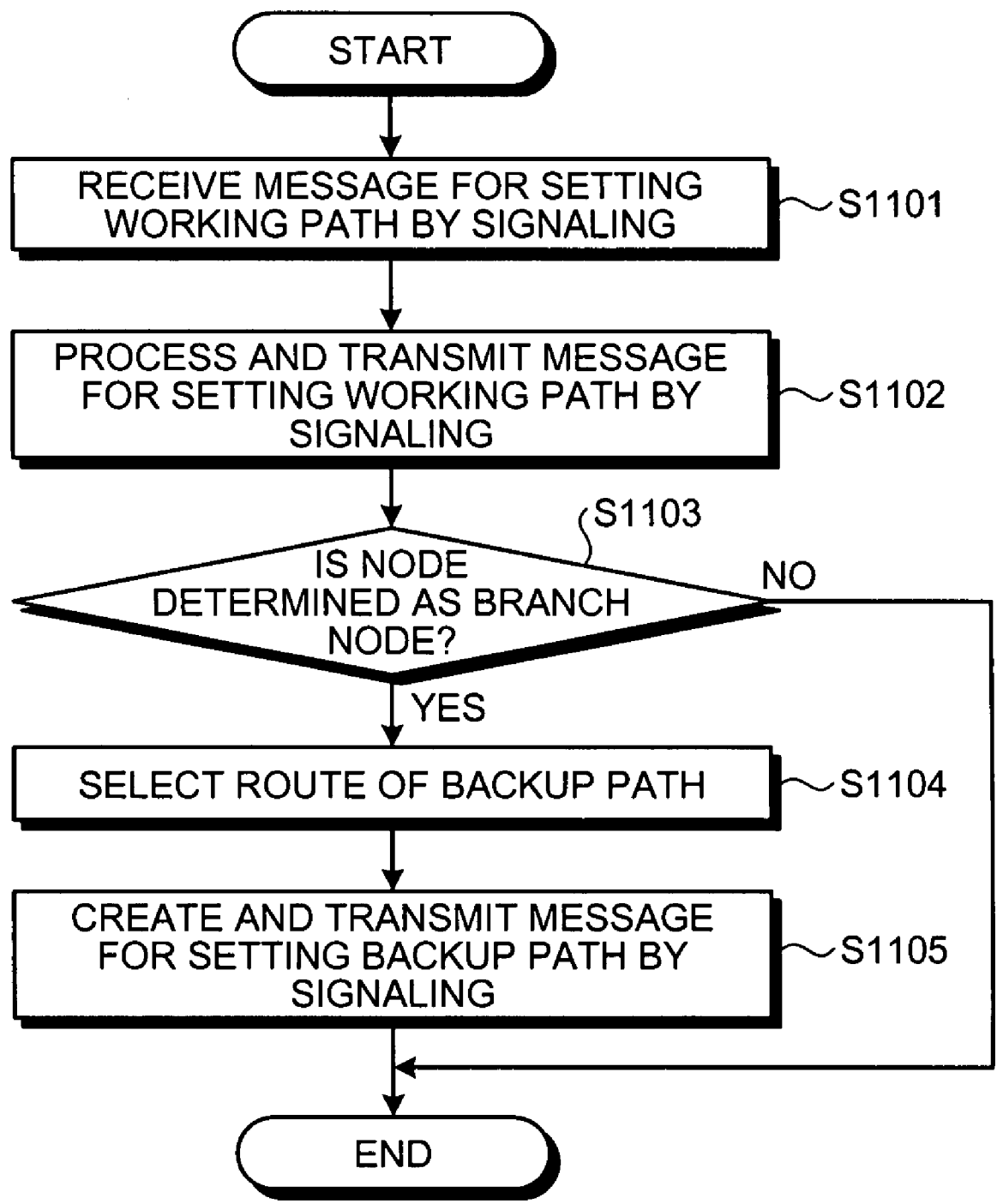
FIG. 11 is a flowchart for explaining processing procedures performed by the node shown in FIG. 2.

Processing procedures performed by the node 10 according to the first embodiment are described below with reference to FIG. 11.

The message processing unit 301 in the node 10 receives a message for setting the working path by a signaling (step S1101).

The message processing unit 301 in the node 10 processes and transmits the message to a transmitting target (step S1102). Specifically, the message processing unit 301 in the node 10 forwards the message to an adjacent node on the working path based on an instruction included in the message, or transmits the message to the branch-node determining unit 302 or the backup-path selecting unit 303 in the node 10.

The branch-node determining unit 302 in the node 10 determines whether each of nodes composing a first ring is a prospective branch node, and determines a branch node based on the determination results of the prospective branch node (step S1103). If the node 10 is not determined as the branch node (No at step S1103), the node 10 finishes processing.

If the node 10 is determined as the branch node (Yes at step S1103), the backup-path selecting unit 303 in the node 10 selects a route of the backup path (step S1104).

The message processing unit 301 in the node 10 creates a message for setting the backup path by a signaling, and transmits the message to the adjacent node (step S1105).

Figure 12:
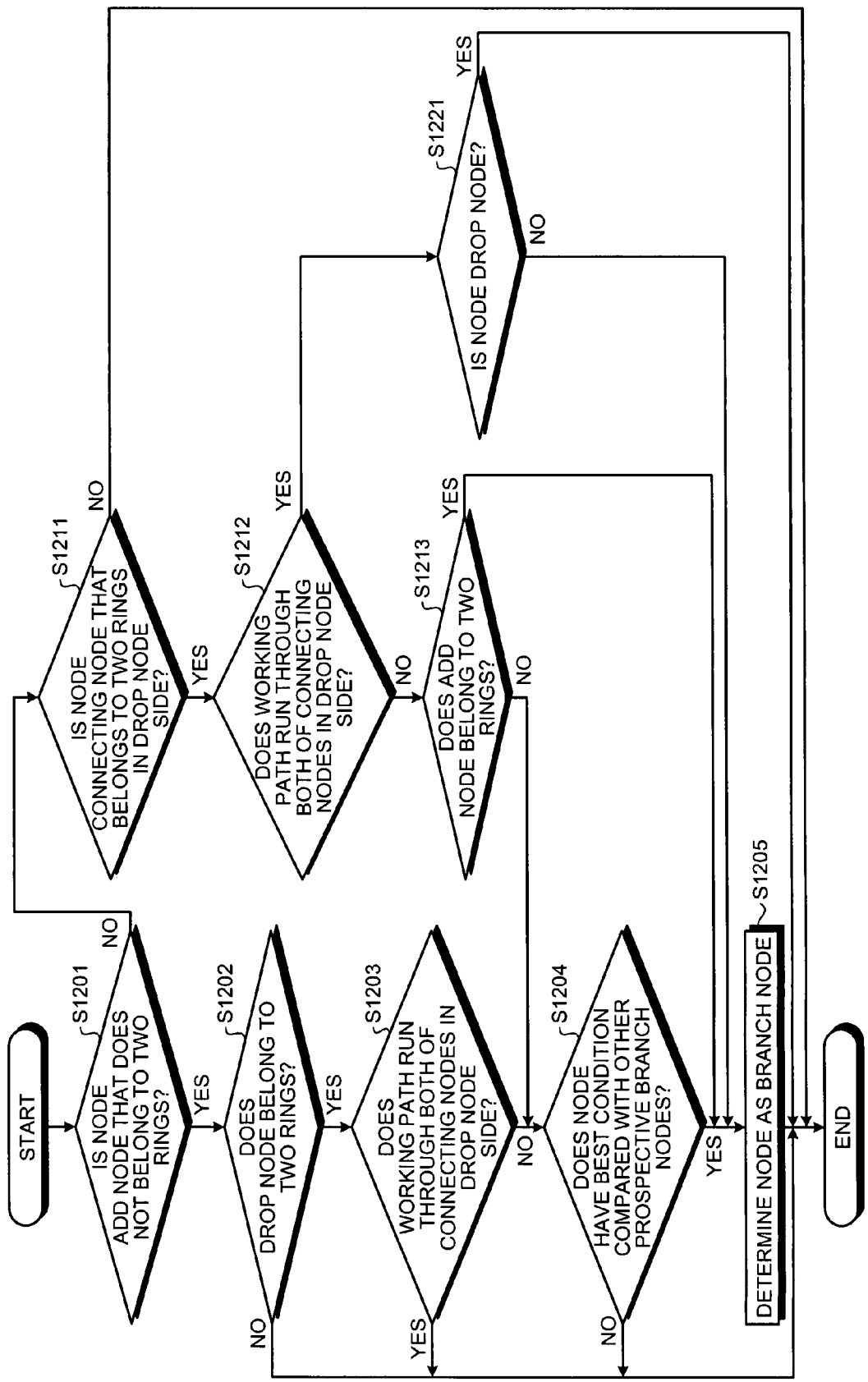
FIG. 12 is a flowchart for explaining processing procedures performed by a branch-node determining unit shown in FIG. 2.

Processing procedures performed by the branch-node determining unit 302 in the node 10 are described below with reference to FIG. 12.

The branch-node determining unit 302 in the node 10 determines whether the node 10 is a start node (an add node) on which the working path starts in the first ring, and also whether the first connection-information storing unit 202 in the node 10 stores therein no connection information between the start node (the add node) and a second ring adjacent to the first ring, i.e., whether the node 10 does not belong to two rings (the first and second rings) (step S1201).

If the node 10 is the start node (the add node) in the first ring, and also if the node 10 does not belong to two rings (the first and second rings) (Yes at step S1201), the branch-node determining unit 302 determines whether the first connection-information storing unit 202 stores therein connection information between an end node (a drop node) on which the working path ends in the first ring and the second ring, i.e., whether the end node (the drop node) belongs to two rings (the first and second rings) (step S1202). If the end node (the drop node) does not belong to two rings (the first and second rings) (No at step S1202), the branch-node determining unit 302 in the node 10 finishes processing.

If the end node (the drop node) in the first ring belongs to two rings (the first and second rings) (Yes at step S1202), the branch-node determining unit 302 determines whether the working path runs through both of connecting nodes that are connected to the second ring in the end node side (in the drop node side) of the first ring (step S1203). If the working path runs through both of the connecting nodes that are connected to the second ring in the end node side (in the drop node side) of the first ring (Yes at step S1203), the branch-node determining unit 302 in the node 10 finishes processing.

If the working path does not run through both of the connecting nodes that are connected to the second ring in the end node side (in the drop node side) of the first ring (No at step S1203), the branch-node determining unit 302 determines whether each of other nodes composing the first ring is a prospective branch node. If any other nodes composing the first ring are determined as the prospective branch node, the branch-node determining unit 302 compares each conditions of selectable routes between each of the prospective branch nodes and a connecting node in the first ring that is connected to the second ring and the working path does not runs therethrough (step S1204). If the condition of the selectable route between the node 10 (one of the prospective branch nodes) and the connecting node is not better than the same for the other prospective branch node based on the comparison result (No at step S1204), the branch-node determining unit 302 in the node 10 finishes processing.

If the condition of the selectable route between the node 10 (one of the prospective branch nodes) and the connecting node is better than the same for the other prospective branch node based on the comparison result (Yes at step S1204), the branch-node determining unit 302 determines the node 10 as the branch node (step S1205), and transmits the determination result of the branch node to the backup-path selecting unit 303 in the node 10. Then, the branch-node determining unit 302 in the node 10 finishes the processing.

At the step S1201, if the node 10 is not the start node (the add node) (No at step S1201), the branch-node determining unit 302 determines whether the node 10 is a connecting node that is connected to the second ring in the end node side (in the drop node side) of the first ring, and also whether the first connection-information storing unit 202 in the node 10 stores therein connection information between the node 10 and the second ring, i.e., whether the node 10 belongs to two rings (the first and second rings) (step S1211). If the node 10 is not the connecting node, i.e., the node 10 does not belong to two rings (the first and second rings) (No at step S1211), the branch-node determining unit 302 in the node 10 finishes processing.

If the node 10 is the connecting node, i.e., the node 10 belongs to two rings (the first and second rings) (Yes at step S1211), the branch-node determining unit 302 determines whether the working path runs through both of connecting nodes that are connected to the second ring in the end node side (in the drop node side) of the first ring (step S1212).

If the working path does not run through both of the connecting nodes (No at step S1212), the branch-node determining unit 302 determines whether the first connection-information storing unit 202 stores therein connection information between a start node (an add node) in the first ring and the second ring, i.e., whether the start node (the add node) belongs to two rings (the first and second rings) (step S1213). If the start node (the add node) belongs to two rings (the first and second rings). (Yes at step S1213), the branch-node determining unit 302 determines the node 10 as the branch node (step S1205) and transmits the determination result of the branch node to the backup-path selecting unit 303 in the node 10. Then, the branch-node determining unit 302 in the node 10 finishes the processing.

If the start node (the add node) does not belong to two rings (the first and second rings) (No at step S1213), the branch-node determining unit 302 determines whether each of other nodes composing the first ring is a prospective branch node. If any other nodes composing the first ring are determined as the prospective branch node, the branch-node determining unit 302 compares each condition of selectable routes between each of the prospective branch nodes and a connecting node in the first ring that is connected to the second ring and the working path does not runs therethrough (step S1204).

At the step S1212, if the working path runs through both of the connecting nodes in the end node side (in the drop node side) of the first ring (Yes at step S1212), the branch-node determining unit 302 determines whether the node 10 is the end node (the drop node) in the first ring (step S1221). If the node 10 is the end node (the drop node) (Yes at step S1221), the branch-node determining unit 302 in the node 10 finishes processing. If the node 10 is not the end node (the drop node) (No at step S1221), the branch-node determining unit 302 determines the node 10 as the branch node (step S1205) and transmits the determination result of the branch node to the backup-path selecting unit 303 in the node 10. Then, the branch-node determining unit 302 in the node 10 finishes the processing.

Figure 13:
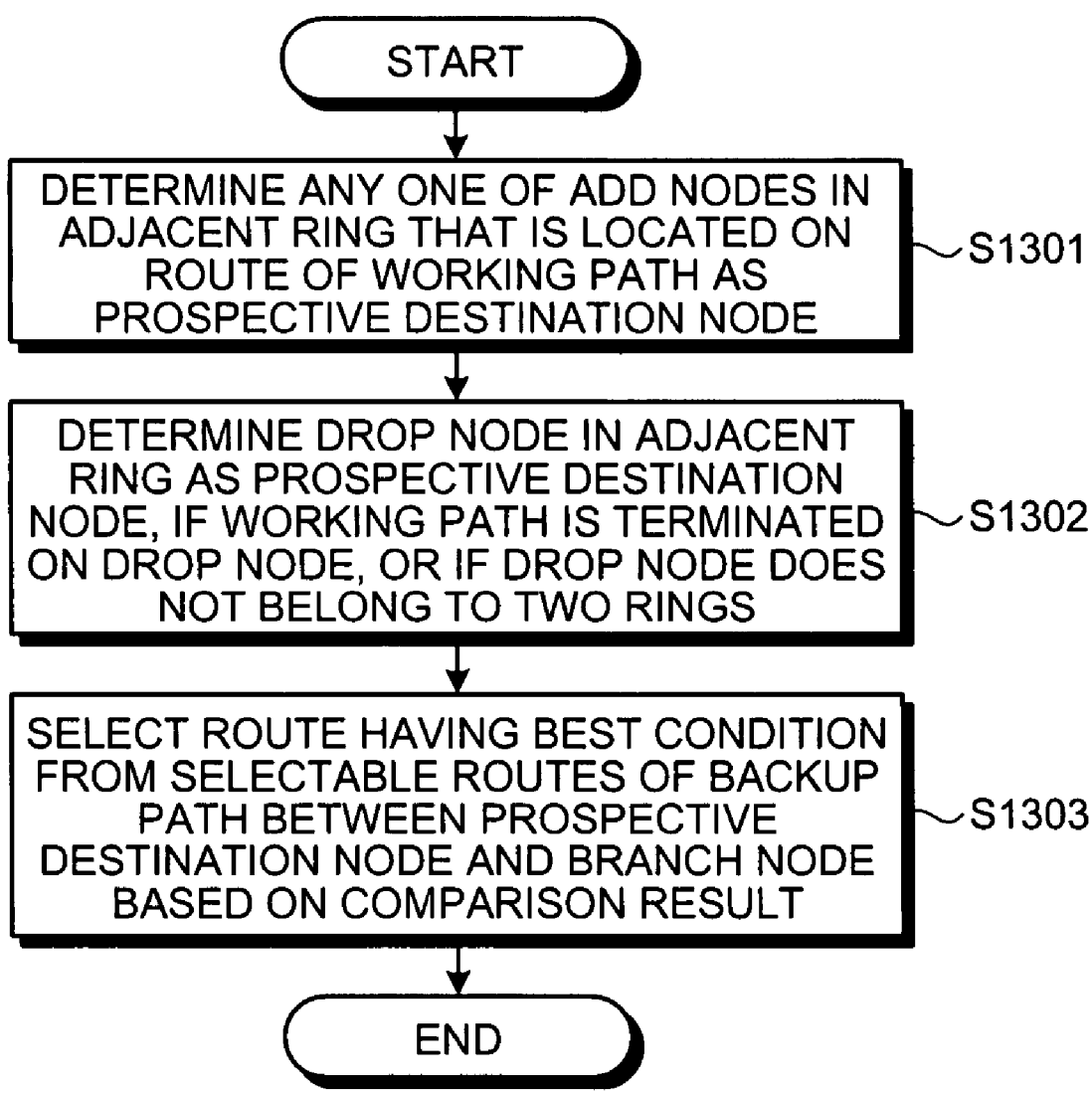
FIG. 13 is a flowchart for explaining processing procedures performed by the backup-path selecting unit.

Processing procedures performed by the backup-path selecting unit 303 are described below with reference to FIG. 13.

Of connecting nodes that are connected to the first ring in the start node side (in the add node side) of the second ring, the backup-path selecting unit 303 determines any one of the connecting node that the working path runs therethrough as a prospective destination node (step S1301).

If the working path is terminated on an end node (a drop node) in the second ring, the backup-path selecting unit 303 determines the end node (the drop node) as the prospective destination node. If the working path is not terminated on the end node (the drop node) in the second ring, and also if the second connection-information storing unit 204 stores therein no connection information between the end node (the drop node) and a third ring, i.e., the end node (the drop node) does not belong to two rings (the second and third rings), the backup-path selecting unit 303 determines the end node (the drop node) as the prospective destination node (step S1302).

The backup-path selecting unit 303 compares each condition of selectable routes between the prospective destination node and the branch node, and selects any one of the selectable routes, which has a better condition, as the backup path based on the comparison result (step S1303).

Figure 14:
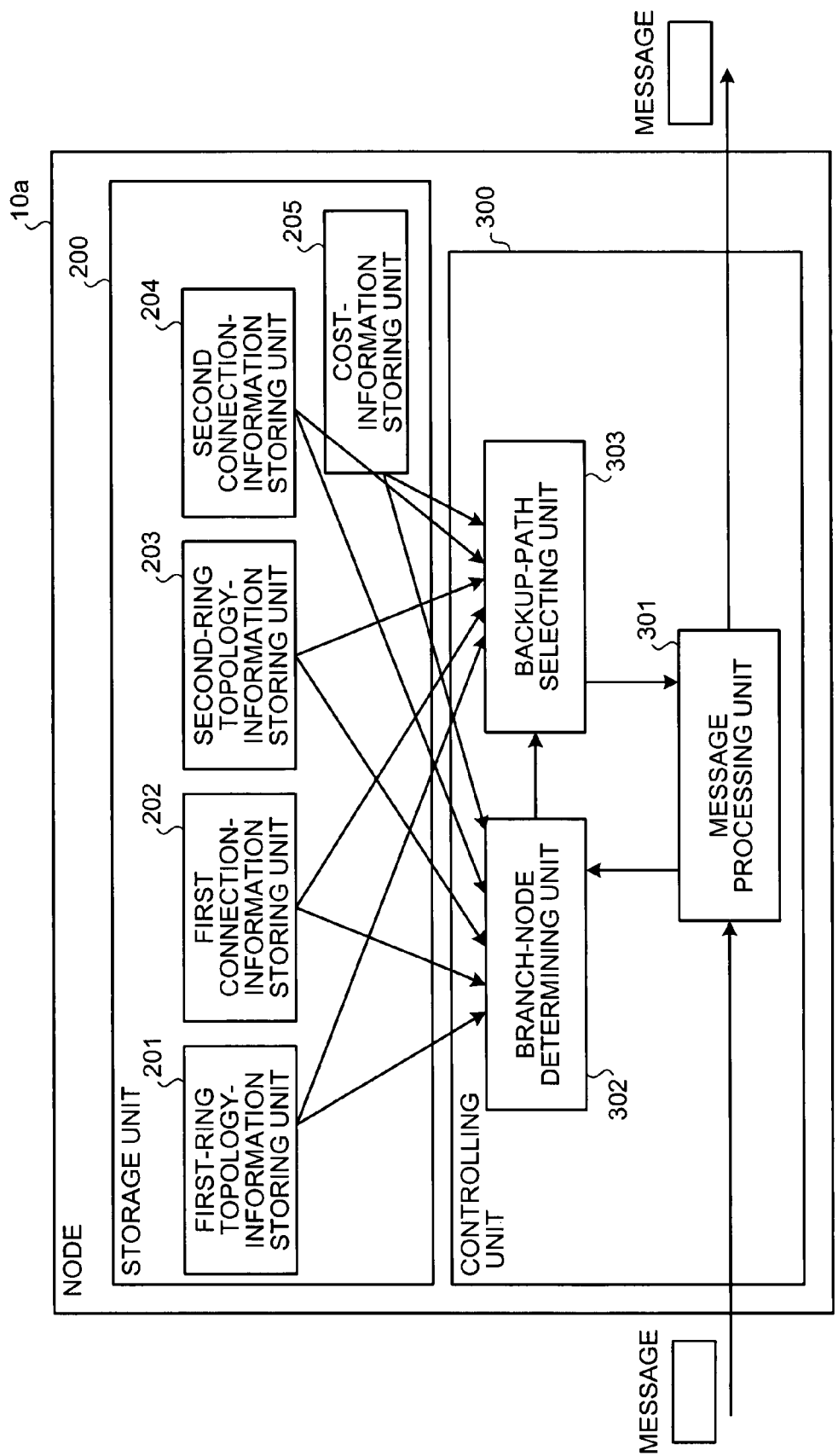
FIG. 14 is a block diagram of a node according to a second embodiment of the present invention.

A node 10a according to a second embodiment is described-below with reference to FIG. 14. The node 10a can be used instead of the node 10 in the networks shown in FIGS. 1A, 8A, or 8B.

A node 10a according to the second embodiment includes, in addition to the components shown in FIG. 2, a cost-information storing unit 205. The cost-information storing unit 205 stores therein cost information such as a distance of a route, a band vacancy of the route (for example, the number of unused channels), a usage fee of the route, or a policy (for example, to give priority to the drop-and-continue method).

In the first embodiment, the branch-node determining unit 302 compares each condition of selectable routes between a connecting node and each of prospective branch nodes based on the number of hops. In the second embodiment, the branch-node determining unit 302 can compare each condition of the selectable routes based on cost information stored in the cost-information storing unit 205.

In the first embodiment, the backup-path selecting unit 303 compares each condition of selectable routes between a branch node and a prospective destination node based on the number of hops, and selects any one of the selectable routes, which has fewer hops, as the backup path. In the second embodiment, the backup-path selecting unit 303 can compare each condition of the selectable routes based on cost information stored in the cost-information storing unit 205.

According to an aspect of the present invention, it is not limited to the network in which the BLSR type of three rings are connected to the adjacent ring via two connection paths as described in the first embodiment. It is also applicable to a network in which a working path and a backup path can be switched in the same manner as the BLSR, a network in which four or more rings are connected to the adjacent ring, or a network in which adjacent rings are connected to each other via multiple (three or more) connection paths.

In the first embodiment, some processes are performed by a manual input. For example, topology information or connection information is stored in the node by the manual input. The processes can be fully or partially performed automatically, for example, by the NMS or the EMS that are provided by a management center or advertised in protocols. Furthermore, it is not limited to the processing procedures, the controlling procedures, names, and information including data and parameters, except for specific ones, those described in the embodiments, and can be changed.

Components of the node, for example, as shown in FIG. 2 or 8 are conceptually depicted. Therefore, the components need not be configured physically as shown in FIG. 2 or 8. The nodes or the components can be fully or partially dispersed or integrated. For example, the first-ring topology-information storing unit 201 and the first connection-information storing unit 202 can be integrated. Processes performed by the nodes and the components are fully or partially executed by a central processing unit (CPU) or a computer program that is analyzed by the CPU, or configured as hardware by the wired logic.

Figure 15:
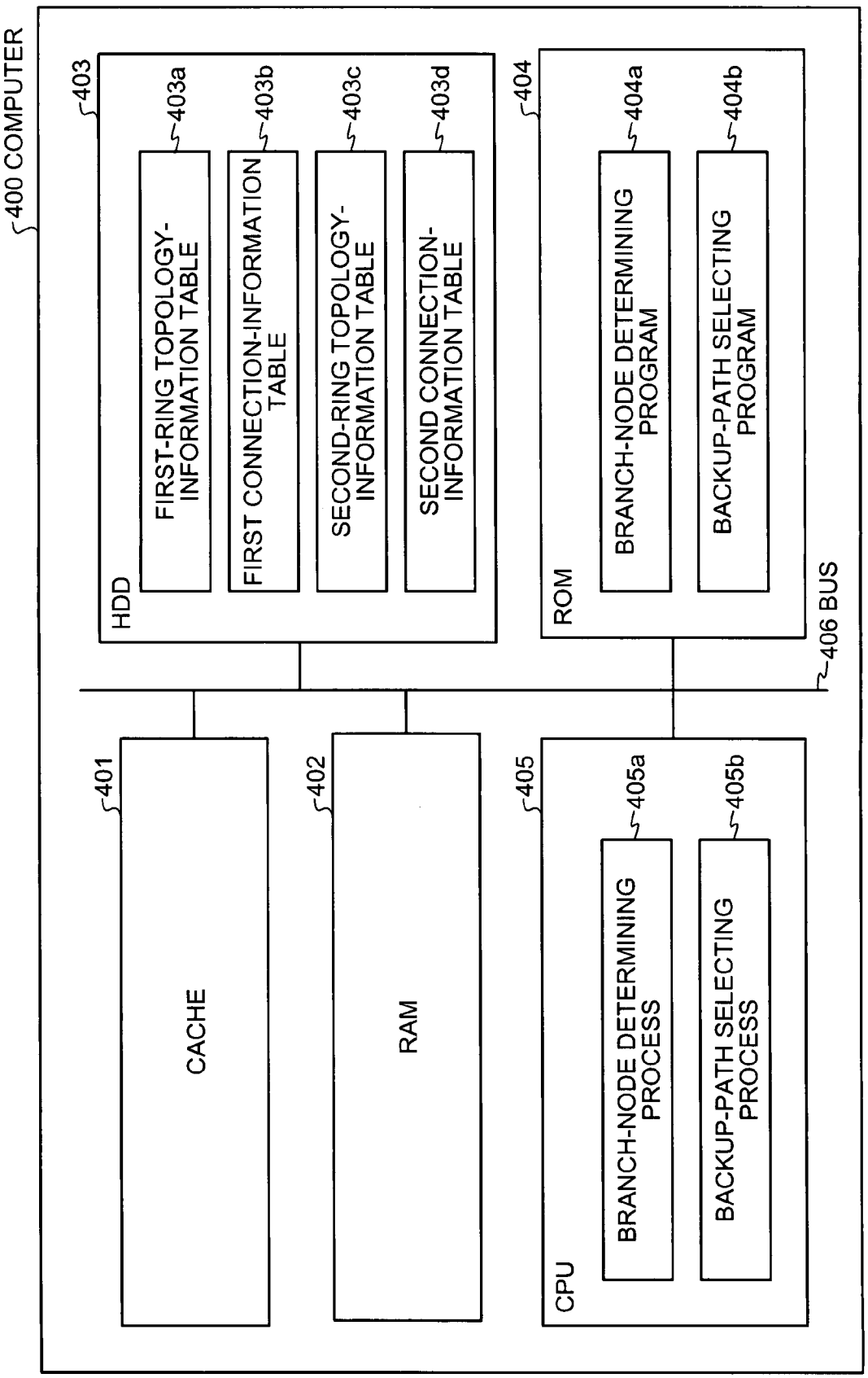
FIG. 15 is a block diagram of a computer that executes a backup-path setting program.

The processes as described in the first embodiment can be performed by causing a personal computer or a workstation to execute a predetermined program. A computer, which executes a program for setting a backup path in the same manner as the first embodiment, is described below with reference to FIG. 15. FIG. 15 is a block diagram of a computer 400 that executes the program for setting a backup path.

The computer 400 includes a cache 401, a random access memory (RAM) 402, a hard disk drive (HDD) 403, a read-only memory (ROM) 404, and a CPU 405. The cache 401, the RAM 402, the HDD 403, the ROM 404, and the CPU 405 are connected to a bus 406. The ROM 404 stores therein a branch-node determining program 404a and a backup-path selecting program 404b that are node programs that functions in the same manner as the first embodiment.

The CPU 405 includes a branch-node determining process 405a and a backup-path selecting process 405b. The branch-node determining process 405a is performed by retrieving the branch-node determining program 404a. The backup-path selecting process 405b is performed by retrieving the backup-path selecting program 404b. The branch-node determining process 405a and the backup-path selecting process 405b correspond to the branch-node determining unit 302 and the backup-path selecting unit 303 respectively.

The HDD 403 includes a first-ring topology-information table 403a, a first connection-information table 403b, a second-ring topology-information table 403c, and a second connection-information table 403d. The first-ring topology-information table 403a, the first connection-information table 403b, the second-ring topology-information table 403c, and the second connection-information table 403d correspond to the first-ring topology-information storing unit 201, the first connection-information storing unit 202, the second-ring topology-information storing unit 203, and the second connection-information storing unit 204 respectively.

Instead of the ROM 404, the branch-node determining program 404*a* and the backup-path selecting program 404*b* can be stored in a portable physical medium such as a flexible disk (FD), a compact disk ROM (CD-ROM), a magnet-optical (MO) disk, a digital versatile disk (DVD), and an integrated circuit (IC) card that are inserted into the computer 400 to be used, or in a fixed physical medium such as a HDD that is installed inside or outside of the computer 400, or in a-server of another computer that is connected to the computer 400 via a public line, the Internet, a local area network (LAN), or a wide area network (WAN). The computer 400 retrieves and executes the stored program 404*a* or 404*b*.

According to an aspect of the present invention, the node determines whether the end node on which the working path ends in the second ring is a connecting node that is connected to the third ring in the end node side of the second ring, i.e., whether the end node belongs to the second and third rings. If the end node is not determined as the connecting node, i.e., the end node does not belong to the second and third rings, a route addressed to the end node is determined as a prospective backup path. Thus, on a network in which three or more rings are connected to the adjacent ring via multiple connection paths, when the working path that runs though the three or more rings is set by a signaling, any one of the multiple connection paths except for the one for the working path can be set as the backup path at the same time.

On the network in which three or more rings are connected to the adjacent ring via multiple connection paths, the backup path can be set at the same time when the working path that runs though the three or more rings is set by a signaling.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A node that sets a backup path by using a signaling for setting a working path, the node being one of a plurality of nodes referred to as a first node group that composes a first ring, a second ring including a plurality of nodes referred to as a second node group being adjacent to the first ring, a third ring including a plurality of nodes referred to as a third node group being adjacent to the second ring, the first ring and the second ring being connected to each other by a plurality of connecting nodes via a plurality of connection paths, the second ring and the third ring being connected to each other by a plurality of connecting nodes via a plurality of connection paths, any one of the connection paths between the rings being used as the working path, and any one of the connection paths between the rings other than those used as the working path being used as the backup path, the node comprising:

a first-ring topology-information storing unit that stores therein topology information about the first node group;

a first connection-information storing unit that stores therein connection information about the connecting nodes between the first ring and the second ring;

a second-ring topology-information storing unit that stores therein topology information about the second node group;

a second connection-information storing unit that stores therein connection information about the connecting nodes between the second ring and the third ring;

a branch-node determining unit that
when the node receives a route of the working path by a signaling, verifies the route of the working path with the topology information stored in the first-ring topology-information storing unit and the connection information stored in the first connection-information storing unit, determines whether each node in the first node group is a prospective branch node that branches into the working path and the backup path thereon, if a plurality of nodes in the first node group are determined as the prospective branch node, compares each condition of selectable routes between each of prospective branch nodes and any one of the connecting nodes in the first ring that is connected to the second ring and is not located on a route of the working path, and determines any one of the prospective branch nodes as a branch node based on a result of comparison, and if only one node in the first node group is determined as the prospective branch node, the one node is determined as the branch node; and a backup-path selecting unit that
when the branch node is determined by the branch-node determining unit, compares following conditions each condition of selectable routes of the backup path between the branch node and any one of the connecting nodes in the second node group that is connected to the first ring and is located on the route of the working path;

each condition of selectable routes of the backup path between the branch node and an end node that the working path ends in the second ring thereon, if the working path is terminated on the end node; and each condition of selectable routes of the backup path between the branch node and the end node, if the second connection-information storing unit stores therein no connection information between the end node and any of the connecting nodes in the third ring that is connected to the second ring, even though the working path is not terminated on the end node, and selects any one of the selectable routes as the backup path based on a result of comparison.

2. The node according to claim 1, wherein when the node is a start node that the working path starts in the first ring thereon, and also when the first connection-information storing unit stores therein no connection information between the node and any one of the connecting nodes in the second ring, if the first connection-information storing unit stores therein connection information between an end node that the working path ends in the first ring thereon and any one of the connecting nodes in the second ring that is connected to the first ring, and if the working path does not run through both of the connecting nodes that are connected to the second ring in the end node side of the first ring, the branch-node determining unit determines the node as the prospective branch node.

3. The node according to claim 1, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path does not run through both of the connecting nodes that are connected to the second ring in the end node side of the first ring, and if the first connection-information storing unit stores therein no connection information between a start node that the working path starts in the first ring thereon and any one of the connecting nodes in the second ring that is connected to the first ring, the branch-node determining unit determines the node as the prospective branch node.

4. The node according to claim 1, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path does not run through both of the connecting nodes that are connected to the second ring in the end node side of the first ring, and if the first connection-information storing unit stores therein connection information between a start node that the working path starts in the first ring thereon and any one of the connecting nodes in the second ring that is connected to the first ring, the branch-node determining unit determines the node as the prospective branch node.

5. The node according to claim 1, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path runs through both of the connecting nodes that are connected to the second ring in the end node side of the first ring, and if the node is not the end node, the branch-node determining unit determines the node as the prospective branch node.

6. A method of setting a backup path on a node by using a signaling for setting a working path, the node being one of a plurality of nodes referred to as a first node group that composes a first ring, a second ring including a plurality of nodes referred to as a second node group being adjacent to the first ring, a third ring including a plurality of nodes referred to as a third node group being adjacent to the second ring, the first ring and the second ring being connected to each other by a plurality of connecting nodes via a plurality of connection paths, the second ring and the third ring being connected to each other by a plurality of connecting nodes via a plurality of connection paths, any one of the connection paths between the rings being used as the working path, and any one of the connection paths between the rings other than those used as the working path being used as the backup path, the method comprising:

storing topology information about the first node group in a first-ring topology-information storing unit;

storing connection information about the connecting nodes between the first ring and the second ring in a first connection-information storing unit;

storing topology information about the second node group in a second-ring topology-information storing unit;

storing connection information about the connecting nodes between the second ring and the third ring in a second connection-information storing unit;

determining including when the node receives a route of the working path by a signaling, verifies the route of the working path with the topology information stored in the first-ring topology-information storing unit and the connection information stored in the first connection-information storing unit, determining whether each node in the first node group is a prospective branch node that branches into the working path and the backup path thereon, if a plurality of nodes in the first node group are determined as the prospective branch node, comparing each condition of selectable routes between each of prospective branch nodes and any one of the connecting nodes in the first ring that is connected to the second ring and is not located on a route of the working path, and determining any one of the prospective branch nodes as a branch node based on a result of comparison, and if only one node in the first node group is determined as the prospective branch node, the one node is determined as the branch node; and selecting including when the branch node is determined at the determining, comparing following conditions each condition of selectable routes of the backup path between the branch node and any one of the connecting nodes in the second node group that is connected to the first ring and is located on the route of the working path;

each condition of selectable routes of the backup path between the branch node and an end node that the working path ends in the second ring thereon, if the working path is terminated on the end node; and each condition of selectable routes of the backup path between the branch node and the end node, if the second connection-information storing unit stores therein no connection information between the end node and any of the connecting nodes in the third ring that is connected to the second ring, even though the working path is not terminated on the end node, and selecting any one of the selectable routes as the backup path based on a result of comparison.

7. The method according to claim 6, wherein when the node is a start node that the working path starts in the first ring thereon, and also when the first connection-information storing unit stores therein no connection information between the node and any one of the connecting nodes in the second ring, if the first connection-information storing unit stores therein connection information between an end node that the working path ends in the first ring thereon and any one of the connecting nodes in the second ring that is connected to the first ring, and if the working path does not run through both of the connecting nodes that are connected to the second ring in the end node side of the first ring, the determining includes determining the node as the prospective branch node.

8. The method according to claim 6, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path does not run through both of the connecting nodes that are connected to the second ring in the end node side of the first ring, and if the first connection-information storing unit stores therein no connection information between a start node that the working path starts in the first ring thereon and any one of the connecting nodes in the second ring that is connected to the first ring, the determining includes determining the node as the prospective branch node.

9. The method according to claim 6, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path does not run through both of the connecting nodes that are connected to the second ring in the end node side of the first ring, and if the first connection-information storing unit stores therein connection information between a start node that the working path starts in the first ring thereon and any one of the connecting nodes in the second ring that is connected to the first ring, the determining includes determining the node as the prospective branch node.

10. The method according to claim 6, wherein when the node is any one of the connecting nodes that is connected to the second ring in the side of an end node that the working path ends in the first ring thereon, and also when the first connection-information storing unit stores therein connection information between the node and any one of the connecting nodes in the second ring, if the working path runs through both of the connecting nodes that are connected to the second ring in the end node side of the first ring, and if the node is not the end node, the determining includes determining the node as the prospective branch node.

* * * * *